(12) United States Patent
Hausner et al.

(10) Patent No.: US 7,450,052 B2
(45) Date of Patent: *Nov. 11, 2008

(54) OBJECT DETECTION METHOD AND APPARATUS

(75) Inventors: Jerry Hausner, Albuquerque, NM (US); Jonathan M. West, Albuquerque, NM (US)

(73) Assignee: The MacAleese Companies, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/433,110

(22) Filed: May 12, 2006

(65) Prior Publication Data

US 2007/0052576 A1 Mar. 8, 2007

Related U.S. Application Data

(63) Continuation-in-part of application No. 10/997,845, filed on Nov. 24, 2004, now Pat. No. 7,167,123, which is a continuation-in-part of application No. 10/340,016, filed on Jan. 9, 2003, now Pat. No. 6,856,271, which is a continuation-in-part of application No. 10/060,641, filed on Jan. 29, 2002, now Pat. No. 6,825,456, which is a continuation-in-part of application No. 09/318,196, filed on May 25, 1999, now Pat. No. 6,342,696.

(60) Provisional application No. 60/680,627, filed on May 12, 2005, provisional application No. 60/525,637, filed on Nov. 25, 2003.

(51) Int. Cl.
*G01S 13/04* (2006.01)

(52) U.S. Cl. .............................. 342/22; 342/27; 342/90; 342/188; 342/195

(58) Field of Classification Search ................... 342/22, 342/27, 175, 192, 195, 196, 61, 179, 188, 342/189, 361; 250/225, 222.2, 559.09
See application file for complete search history.

(56) References Cited

U.S. PATENT DOCUMENTS 3,028,596 A 4/1962 McGillem et al.

(Continued)

FOREIGN PATENT DOCUMENTS

DE 42 43 527 A1 1/1996

(Continued)

OTHER PUBLICATIONS

Abbott, G. F., "Personal Surveillance System", *IBM Technical-Disclosure Bulletin*, vol. 12, No. 7, (Dec. 1969),1119-1120.

(Continued)

*Primary Examiner*—Isam Alsomiri
(74) *Attorney, Agent, or Firm*—Philip D. Askenazy; Peacock Myers, P.C.

(57) ABSTRACT

Method and apparatus for detecting objects. In one embodiment, a person entering a secured zone is illuminated with low-power polarized radio waves. Differently polarized waves which are reflected back from the person are collected. Concealed weapons are detected by measuring various parameters of the reflected signals and then calculating various selected differences between them. These differences create patterns when plotted as a function of time. Preferably a trained neural network pattern recognition program is then used to evaluate these patterns and autonomously render a decision on the presence of a weapon. An interrupted continuous wave system may be employed. Multiple units may be used to detect various azimuthal angles and to improve accuracy.

18 Claims, 15 Drawing Sheets

U.S. PATENT DOCUMENTS

| | | |
|---|---|---|
| 3,500,395 A | 3/1970 | Foster et al. |
| 3,599,211 A | 8/1971 | Mardon |
| 3,669,038 A | 6/1972 | Watson |
| 3,707,672 A | 12/1972 | Miller et al. |
| 3,713,156 A | 1/1973 | Pothier |
| 3,716,823 A | 2/1973 | Thompson et al. |
| 3,911,435 A | 10/1975 | Mardon et al. |
| 3,924,546 A | 12/1975 | Pretini |
| 4,064,458 A | 12/1977 | De Loach, Jr. |
| 4,122,783 A | 10/1978 | Pretini |
| 4,341,165 A | 7/1982 | Calandritti et al. |
| 4,461,221 A | 7/1984 | Schandle et al. |
| 4,481,887 A | 11/1984 | Urbano |
| 4,521,861 A | 6/1985 | Logan et al. |
| 4,586,441 A | 5/1986 | Zekich |
| 4,656,954 A | 4/1987 | Tonali |
| 4,675,677 A | 6/1987 | von Maydell et al. |
| 4,691,204 A | 9/1987 | Hiramoto |
| 4,706,031 A | 11/1987 | Michiguchi et al. |
| 4,905,008 A | 2/1990 | Kawano et al. |
| 4,951,058 A | 8/1990 | Schriner et al. |
| 5,039,981 A | 8/1991 | Rodriguez |
| 5,073,782 A | 12/1991 | Huguenin et al. |
| 5,081,456 A | 1/1992 | Michiguchi et al. |
| 5,195,448 A | 3/1993 | Sims |
| 5,222,155 A | 6/1993 | Delanoy et al. |
| 5,227,800 A | 7/1993 | Huguenin et al. |
| 5,311,166 A | 5/1994 | Frye |
| 5,334,981 A | 8/1994 | Smith et al. |
| 5,337,053 A | 8/1994 | Dwyer |
| 5,345,240 A | 9/1994 | Frazier |
| 5,365,237 A | 11/1994 | Johnson et al. |
| 5,381,153 A | 1/1995 | Saito et al. |
| 5,384,895 A | 1/1995 | Rogers et al. |
| 5,394,153 A * | 2/1995 | Borofka ..................... 342/20 |
| 5,406,290 A | 4/1995 | James et al. |
| 5,408,414 A | 4/1995 | Nomoto et al. |
| 5,446,461 A | 8/1995 | Frazier |
| 5,455,590 A | 10/1995 | Collins et al. |
| 5,457,394 A | 10/1995 | McEwan |
| 5,512,834 A | 4/1996 | McEwan |
| 5,517,429 A | 5/1996 | Harrison |
| 5,519,400 A | 5/1996 | McEwan |
| 5,552,705 A | 9/1996 | Keller |
| 5,552,766 A | 9/1996 | Lee et al. |
| 5,557,283 A | 9/1996 | Sheen et al. |
| 5,576,972 A | 11/1996 | Harrison |
| 5,598,152 A | 1/1997 | Scarzello et al. |
| 5,644,314 A | 7/1997 | Ahmad et al. |
| 5,673,050 A | 9/1997 | Moussally et al. |
| 5,692,446 A | 12/1997 | Becker et al. |
| 5,694,498 A | 12/1997 | Manasson et al. |
| 5,694,867 A | 12/1997 | Diaz-Lopez |
| 5,706,402 A | 1/1998 | Bell |
| 5,774,357 A | 6/1998 | Hoffberg et al. |
| 6,166,682 A | 12/2000 | Kosugi et al. |
| 6,359,582 B1 | 3/2002 | MacAleese et al. |
| 6,615,622 B2 | 9/2003 | MacAleese et al. |
| 7,064,701 B2 * | 6/2006 | Steinway et al. .............. 342/22 |
| 2002/0057093 A1 | 5/2002 | Knox |

FOREIGN PATENT DOCUMENTS

| | | |
|---|---|---|
| GB | 1603578 | 11/1981 |
| JP | 09-304517 | 11/1997 |
| WO | WO 87/00930 | 2/1987 |
| WO | WO 91/02323 | 2/1991 |
| WO | WO 94/27168 | 11/1994 |
| WO | WO 96/19737 | 6/1996 |
| WO | WO 97/01771 | 1/1997 |

OTHER PUBLICATIONS

Bhanu, B., "Guest Editorial: Introduction to the Special Issue on Automatic Target Detection and Recognition", *IEEE Transactions on Image Processing*, vol. 6, No. 1, (Jan. 1997),1-6.

Currie, Nicholas C., et al., "ARPA/NIJ/Rome laboratory concealed weapons detection program: an overview", *Proceedings of SPIE*, vol. 2755,(Jun. 1996),492-502.

Demma, Fred J., et al., "Remote Concealed Weapon Detection by Electromagnetic Imaging Techniques", *U.S. Air Force Rome Laboratory*, No year of publication available,309-312.

Felber, F. S., "Fusion of radar and ultrasound sensors for concealed weapons detection", *Procc. SPIE 1996 & Conf. Signal Processing, Sensor Fusion and Target Recognition V*, (Apr. 1, 1996),514-521.

Madrid, Juan J., et al., "A Neural Network Approach to Doppler-Based Target Classification", *International Conference Radar 92*, Brighton, GB, London, GB,(Oct. 12, 1992),450-453.

McMakin, D. L., et al., "Remote Concealed Weapons and Explosive Detection on People Using Millimeter-Wave Holography", *IEEE*, (1996), 19-25.

McMillan, R. W., et al., "Concealed Weapon Detection Using Microwave and Millimeter Wave Sensors", *IEEE*, (1998), 1-4.

Murray, N. C., et al., "Exploitation of X-Ray Technology for the Detection of Contraband—Aviation Security Applications", *European Conf. on Sec. and Detection*, Conference Publ. No. 437,(Apr. 28, 1997), 13-18.

Reber, E. E., et al., "Evaluation of Active and Passive Near-Millimeter-Wave Radiometric Imaging Techniques for Detection of Concealed Object", *Aerospace Report No. ATR-80 (7843)-2, Sandia Laboratories*, Albuquerque, New Mexico 87115, Contract No. 13-90245,(Mar. 20, 1981).

Varshney, P. K., et al., "On the Modeling of the Sensor Fusion Process for Concealed Weapons Detection", *IEEE*, (1998),14.

* cited by examiner

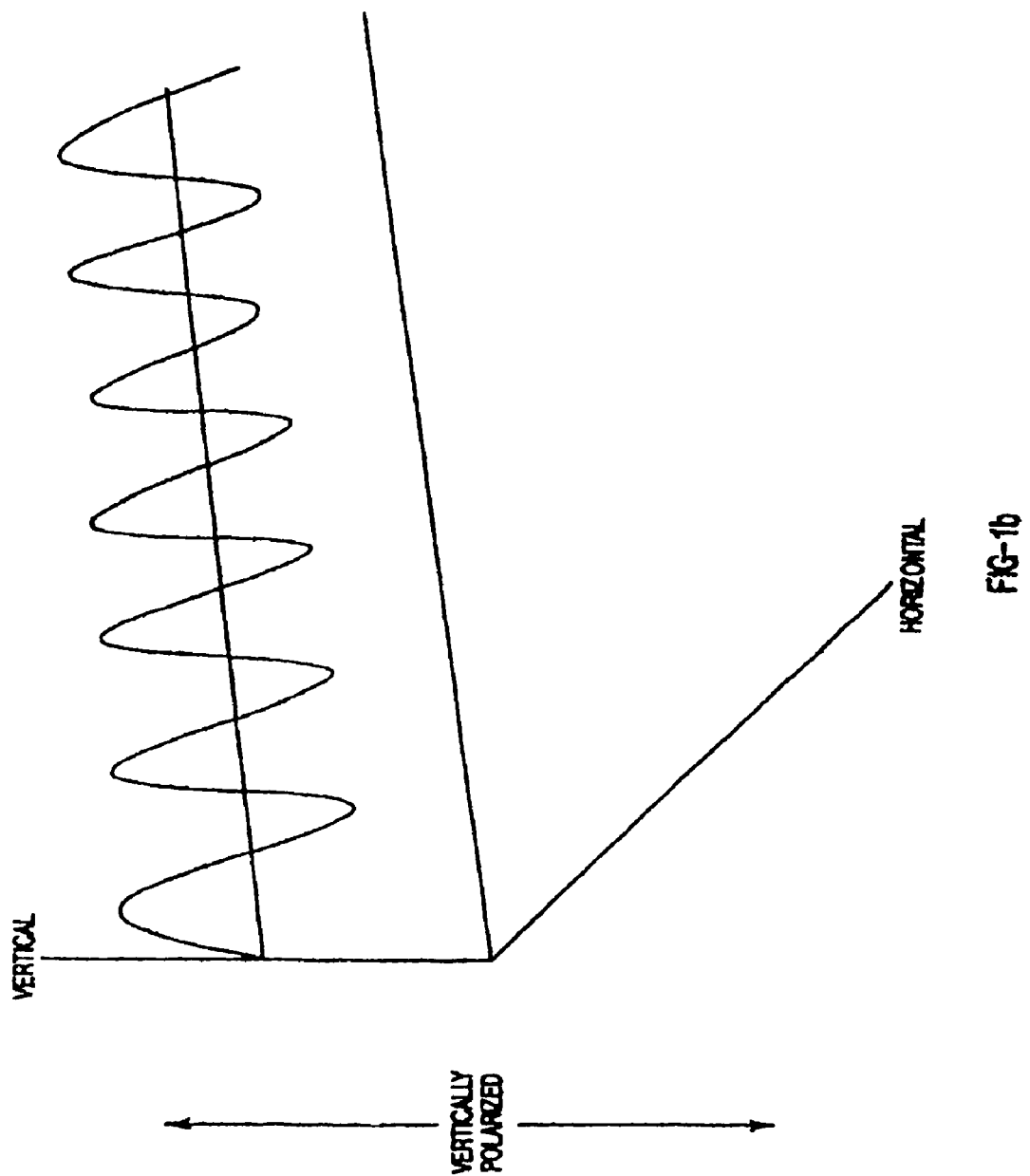

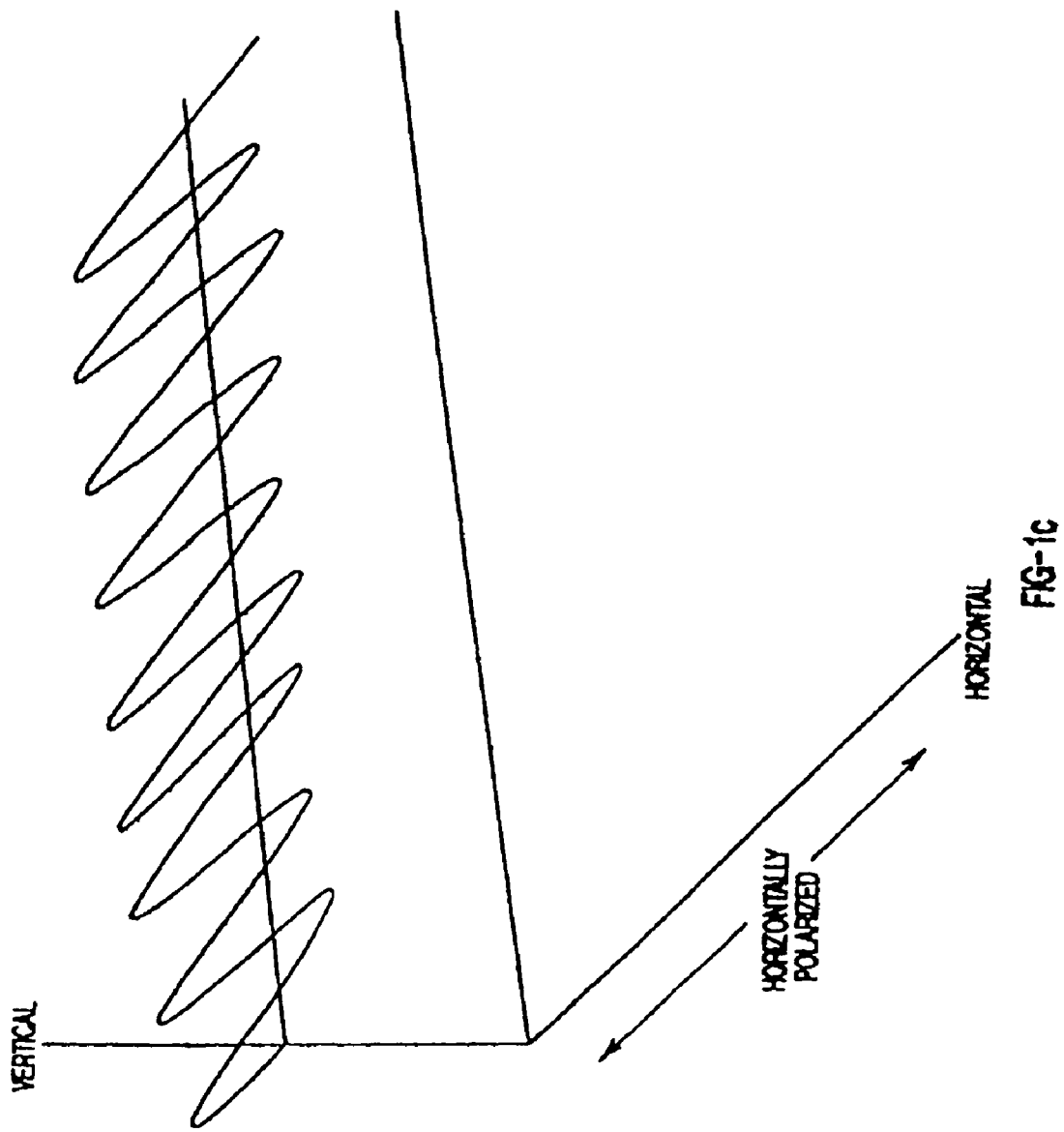

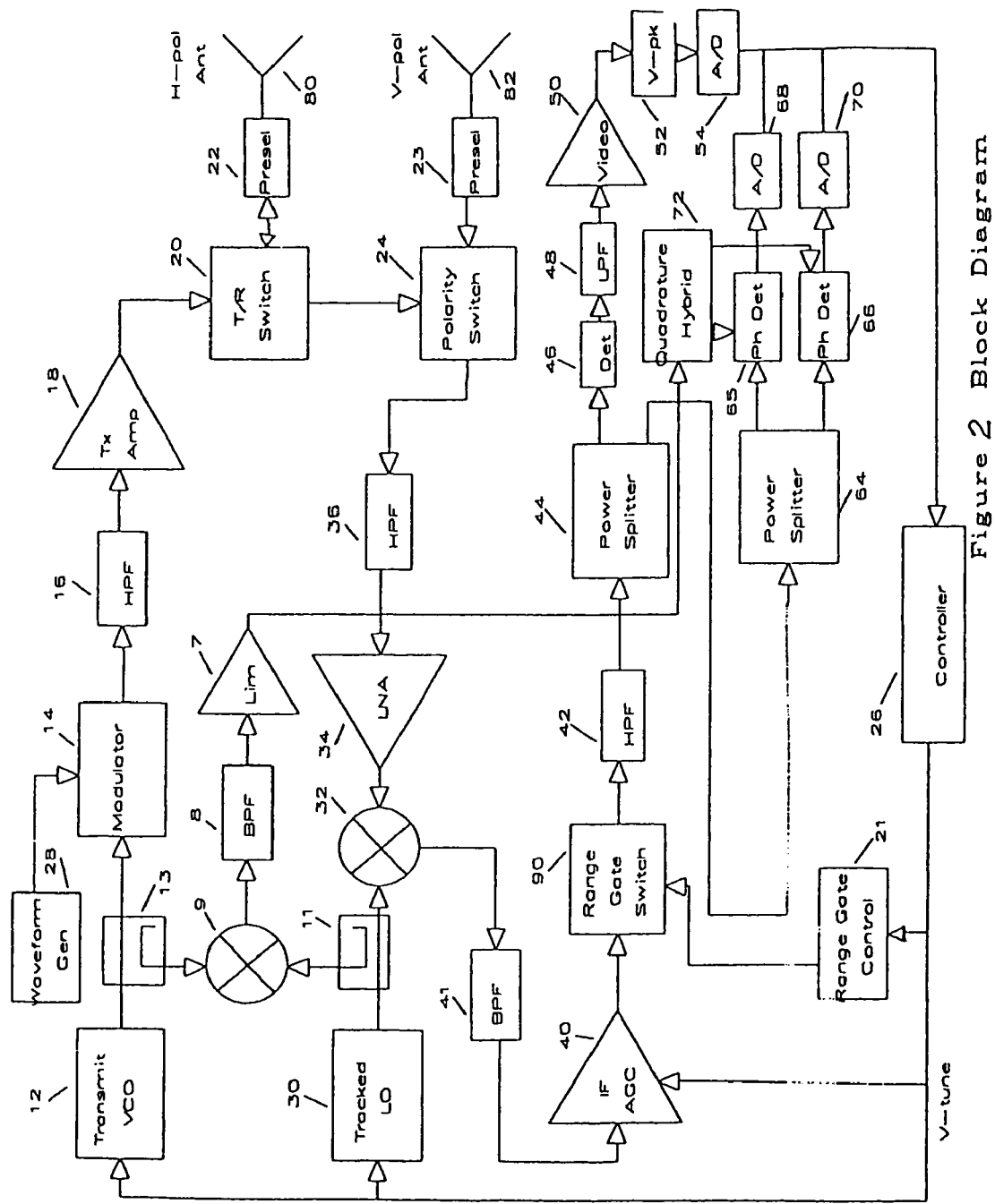
Figure 2 Block Diagram

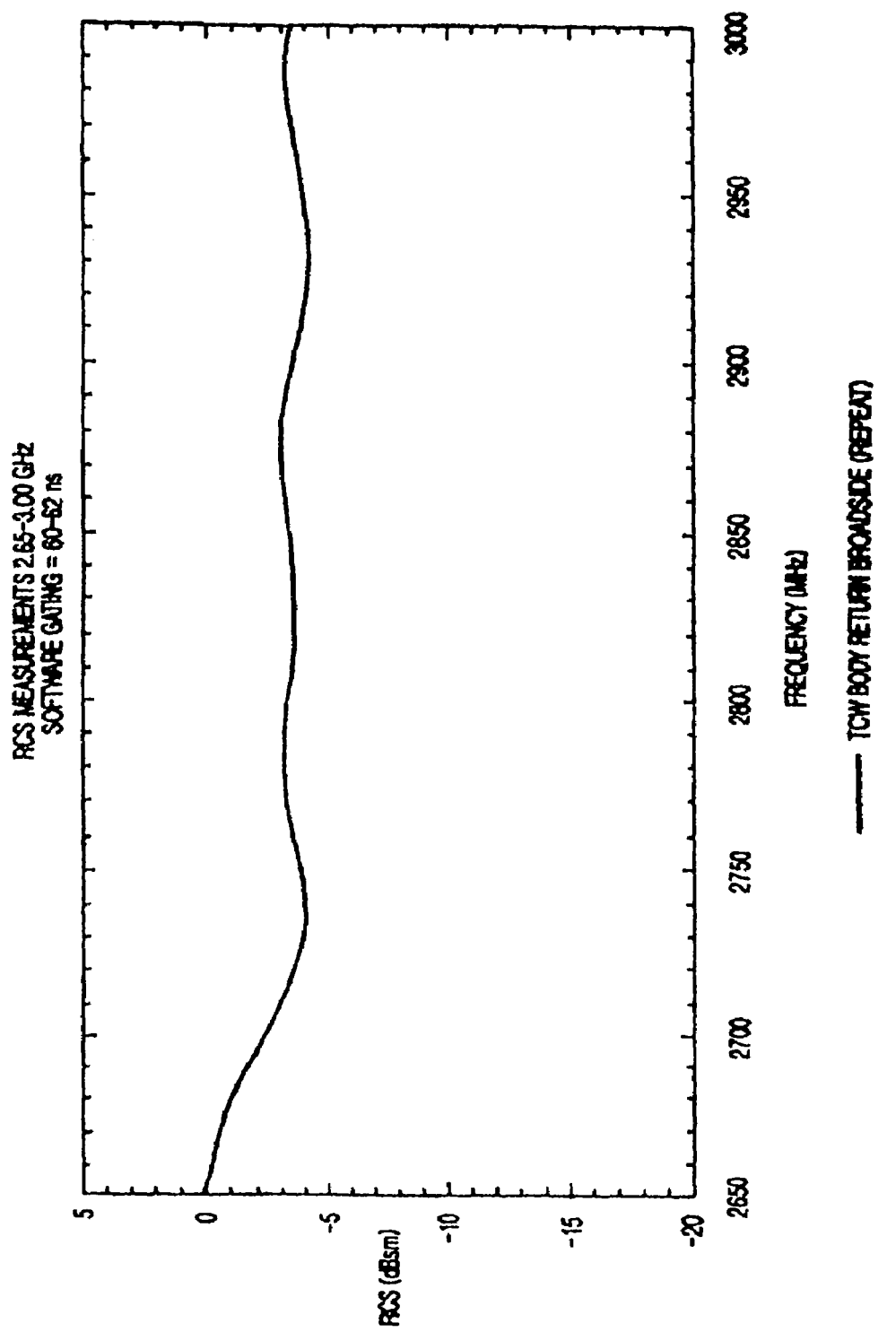

System Flow Diagram

OBJECT DETECTION METHOD AND APPARATUS

CROSS-REFERENCE TO RELATED APPLICATIONS

This application claims the benefit of the filing of U.S. Provisional Patent Application Ser. No. 60/680,627, entitled "Object Detection Method and Apparatus", filed on May 12, 2005. This application is also a continuation-in-part application of U.S. patent application Ser. No. 10/997,845, entitled "Object Detection Method and Apparatus", filed on Nov. 24, 2004, which claims the benefit of the filing of U.S. Provisional Patent Application Ser. No. 60/525,637, entitled "Object Detection Method and Apparatus Employing Polarized Radiation and Artificial Intelligence Processing", filed on Nov. 25, 2003, and which is also a continuation-in-part application of U.S. patent application Ser. No. 10/340,016, entitled "Signal Processing for Object Detection System", filed on Jan. 9, 2003, which is a continuation-in-part of U.S. patent application Ser. No. 10/060,641, entitled "Signal Processing for Object Detection System", filed on Jan. 29, 2002, and issuing on Nov. 30, 2004 as U.S. Pat. No. 6,825,456, which is a continuation-in-part of U.S. patent application Ser. No. 09/318,196, entitled "Object Detection System", filed on May 25, 1999 and issued on Jan. 29, 2002 as U.S. Pat. No. 6,342,696. The specifications of all said applications are incorporated herein by reference.

FIELD OF THE INVENTION

The present invention is a method and apparatus for remotely detecting the presence of an object, including but not limited to a concealed weapon such as a gun or bomb. The invention further comprises novel signal processing methods and apparatuses for providing high reliability object detection.

BACKGROUND OF THE INVENTION

Note that the following discussion refers to a number publications and references. Discussion of such publications herein is given for more complete background of the scientific principles and is not to be construed as an admission that such publications are prior art for patentability determination purposes.

On 20 Apr. 1999, two students at the Columbine High School in Littleton, Colo. opened fire on their classmates and teachers with assault weapons. Twelve teenagers and one teacher were killed, and dozens of others were wounded. Tragic acts of violence like the Littleton massacre occur all too often in present day America. The Federal Bureau of Investigation reports that every year, criminals in the United States use firearms to commit over 2.4 million robberies, 5.6 million assaults, and 165,000 rapes. (See *American Firearms Industry Journal*, published by the National Association of Federally Licensed Firearms Dealers) The Center for Disease Control has collected data showing that 247,979 "firearm deaths" were recorded in the United States during the years 1986-1992. (Data compiled by the Center to Prevent Handgun Violence.) Furthermore, in recent years, a new threat has evolved; that is the suicide bomber. These are more dangerous and more devastating and because of the nature of their weapon, it is imperative that they be detected at a long distance.

Many previous efforts to reduce the threat posed by the criminal use of firearms have met with limited success. In the past two decades, very expensive x-ray equipment has been installed in major airports. The machines are generally capable of detecting a metal gun in a very specialized, closed environment. This type of equipment requires a fixed installation, occupies a very large space, is close-range and may cost hundreds of thousands or even millions of dollars.

None of the complex concealed weapon detectors that are currently available in the commercial market are compact, lightweight, portable, easy to use, long-range and highly reliable. The development of such a device would constitute a revolutionary achievement and would satisfy a long felt need in the fields of law enforcement and security.

Earlier versions of the present invention are described in U.S. Pat. No. 6,243,036, issued Jun. 5, 2001, entitled "Signal Processing for Object Detection System", U.S. Pat. No. 6,359,582, issued Mar. 19, 2002, entitled "Concealed Weapons Detection System", International Patent Application Number PCT/US97/16944, entitled "Concealed Weapons Detection System", published on Mar. 26, 1998 as International Publication Number WO 98/12573, and International Patent Application Number PCT/US00/14509, entitled Signal Processing for Object Detection System", published on Dec. 14, 2000 as International Publication Number WO 00/75892. The specifications and claims of these references are incorporated herein by reference.

SUMMARY OF THE INVENTION

The present invention is a method of determining the presence of an object associated with a target, the method comprising the steps of: illuminating the target with polarized illuminating radiation; collecting first radiation reflected from the target which has a same polarization as the illuminating radiation; collecting second radiation reflected from the target which has an opposite polarization from the illuminating radiation; and employing a weighted plurality of criteria of the first radiation and the second radiation to determine the presence of the object. The employing step preferably comprises employing a weighted plurality of criteria of the collected radiation converted to a time domain by a Chirp-Z Transform process. The employing step preferably comprises employing a magnitude spread of one or both of the first radiation and the second radiation at a plurality of times. The employing step further preferably comprises employing a plurality of criteria selected from the group consisting of a first magnitude of the first radiation at zero time after conversion to the time domain by the Chirp-Z Transform process, a second magnitude of the second radiation at zero time after conversion to the time domain by the Chirp-Z Transform process, and a difference between the first magnitude and the second magnitude. The employing step optionally comprises employing a time of arrival difference between the first radiation and the second radiation and or a measurement of the shape of a curve, preferably the ratio of the peak value of the curve to the total area under the curve, of one or both of the first radiation and the second radiation in the time domain or frequency domain.

The method is preferably repeated a plurality of times, and further comprises the step of combining results of each performance of the method. The method preferably further comprises the step of training a neural network on calibration data, and the employing step preferably further comprises the step of using the neural network to autonomously determine presence of the object.

The target preferably comprises a person and the object preferably comprises a concealed weapon, preferably selected from the group consisting of a knife, firearm, gun, bomb, explosive device, and suicide vest.

The present invention is also an apparatus for detecting an object associated with a target, the apparatus comprising a transmit antenna for illuminating the target with polarized illuminating radiation, a first receive antenna for collecting first radiation reflected from the target which has a same polarization as the illuminating radiation, a second receive antenna for collecting second radiation reflected from the target which has an opposite polarization from the illuminating radiation, and a processor for employing a weighted plurality of criteria of the first radiation and the second radiation to determine a presence of the object. The processor preferably employs a weighted plurality of criteria of the collected radiation converted to the time domain by a Chirp-Z Transform process, and preferably employs a magnitude spread of one or both of the first radiation and the second radiation at a plurality of times. The processor also preferably employs a plurality of criteria selected from the group consisting of a first magnitude of the first radiation at zero time after conversion to the time domain by the Chirp-Z Transform process, a second magnitude of the second radiation at zero time after conversion to the time domain by the Chirp-Z Transform process, and a difference between the first magnitude and the second magnitude.

The processor further preferably employs a time of arrival difference between the first radiation and the second radiation, preferably employs a shape of a curve of one or both of the first radiation and the second radiation in the time domain or frequency domain, and preferably employs a variation in time of one or both of the first radiation and the second radiation. The processor preferably combines results from a plurality of applications of the illuminating radiation to the target. A single dual-polarized antenna optionally comprises said first receive antenna and said second receive antenna.

The target is preferably a person. The object is preferably a concealed weapon, preferably selected from the group consisting of a knife, firearm, gun, bomb, explosive device, and suicide vest. The processor preferably employs a neural network to automatically detect the presence of the object, preferably assigning a value to each of the criteria and determining the presence of the object based on a combination of values of the criteria.

The invention is also a method for detecting an object concealed on a target, the method comprising the steps of transmitting continuous wave electromagnetic radiation to the target at selected frequencies within a frequency range, receiving two orthogonally polarized signals reflected from the target at each selected frequency, measuring the amplitude and phase of the reflected signals, generating a frequency domain waveform, transforming the waveform to a time domain in a time window corresponding to a distance to the target, and processing the time domain waveform to determine whether an object is concealed on the target. The method preferably further comprises the step of filtering the frequency domain waveform, preferably using a Hamming filter. The transforming step preferably comprises using a Chirp-Z transform. The transforming step preferably results in range gating of the signal.

The method preferably employs a plurality of units, each unit performing the transmitting and receiving steps. The units preferably perform the transmitting step sequentially. Continuous wave transmission of each unit is preferably interrupted to allow the other units to transmit radiation, in which case the time of continuous wave transmission of each unit is long compared to the transit time of the radiation from the unit to the target and back to the unit. The units preferably perform the receiving step sequentially, wherein each unit preferably receives signals transmitted solely by its own transmitter. Each unit optionally receives signals transmitted by a transmitter of another unit. Reflected signals received by the units are preferably compared. For example, the signal amplitudes received by each unit may be averaged. The units are preferably disposed at different heights relative to the target, and are preferably oriented to illuminate the target from different viewpoints. The object is preferably selected from the group consisting of weapon, firearm, bomb, suicide vest, explosive, merchandise, tag, work in process, inventory, and manufacturing product. The method is optionally performed to prevent shoplifting or inventory theft.

An object of the present invention is to provide a detection device which is preferably compact, lightweight, long-range, portable and battery-operable. This enables a preferred embodiment of the device to be hand-carried unit that could be used by law enforcement officers and/or military or security personnel, for example to determine if a particular individual is armed.

An advantage of the present invention is that the power levels radiated by the present invention are preferably much lower than conventional radar systems or those generated by x-ray or other imaging systems that are currently employed to detect objects at the entry of an airport or a courtroom. For the present invention the average power density at the target is orders of magnitude below the safety limit for non-ionizing radiation.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1b illustrates a simple wave that is vertically polarized;

FIG. 1c illustrates a simple wave that is horizontally polarized;

FIG. 2 provides a block diagram of one embodiment of a transmission and detection circuit;

FIG. 4a is a graph showing the radar cross section of a handgun, plotting reflected energy in dBsm versus frequency;

FIG. 4b is a graph showing the radar cross section of a human body, plotting reflected energy in dBsm versus frequency;

In FIG. 8, the person was not carrying a gun; in FIG. 9, the same person was carrying a handgun, and the distance between the maxima of the two curves is much closer;

DESCRIPTION OF THE PREFERRED EMBODIMENTS

Best Modes for Carrying Out the Invention

The present invention comprises methods and apparatus for detecting the presence of an object at a distance. One embodiment of the invention may be used to locate a concealed firearm and/or bomb carried by a person. The invention may be used to help keep weapons out of any secure area or "Safe Zone™," such as a school, bank, airport, embassy, prison, courtroom, office building, retail store or residence. The term "Safe Zone™" is a Trade and Service Mark owned by the Assignee of the present Patent Application, The MacAleese Companies, doing business as Safe Zone™ Systems, Incorporated.

The object is preferably associated with a target, for example a person approaching a doorway, and is detected preferably using polarized low power radio waves. As used throughout the specification and claims, the term "target" means something toward which illuminating radiation is pointed, including but not limited to a person, backpack, luggage, bag, shrub, and the like. As used throughout the specification and claims, the term "object" means a physical item that is carried on, worn, concealed on, physically attached to, or coupled or otherwise associated with a target, including but not limited to a weapon, knife, firearm, gun, pistol, rifle, bomb, suicide vest, shrapnel, wiring, and the like.

Figure 1A:
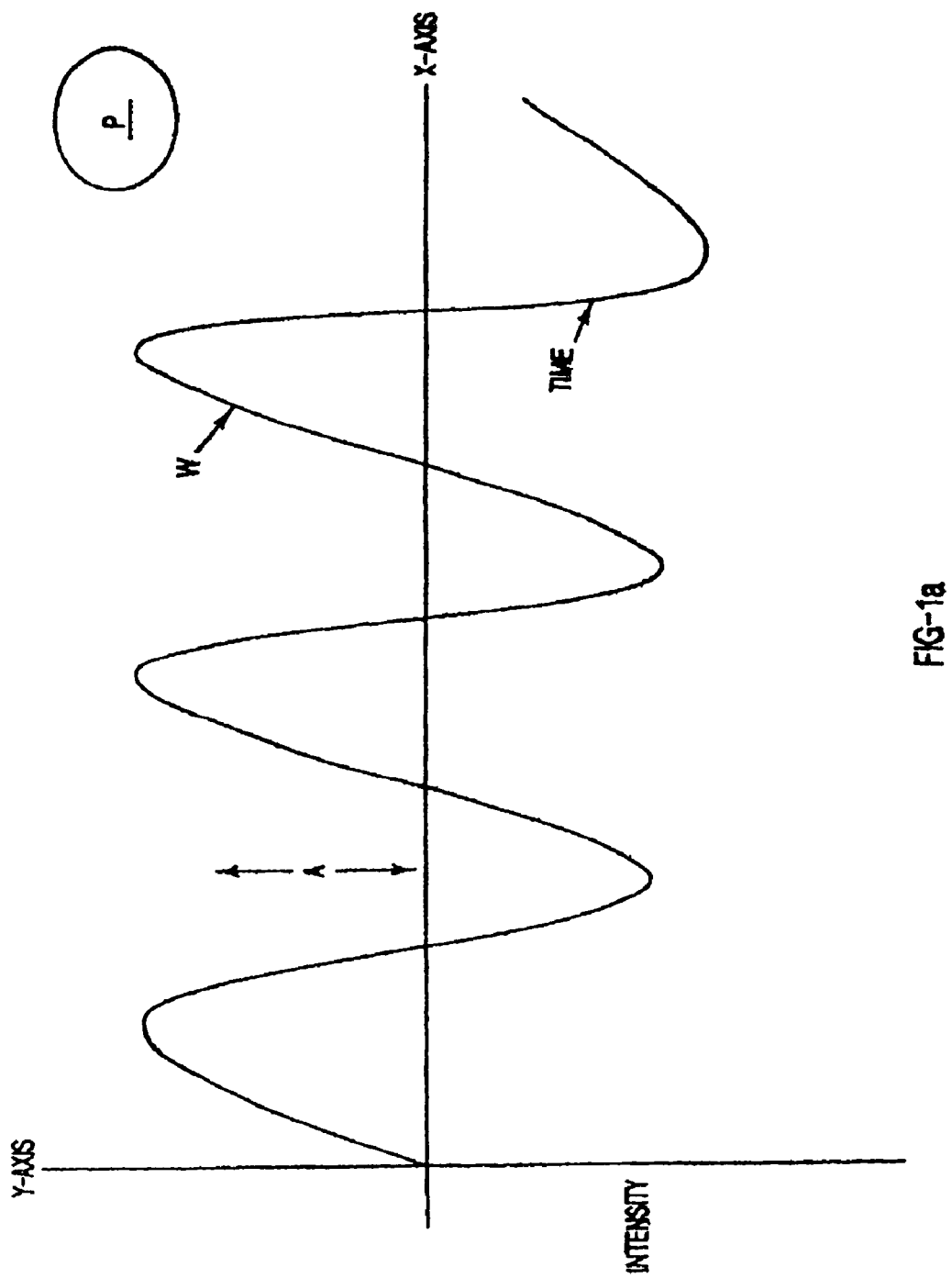
FIG. 1a illustrates a simple wave.

As radio waves travel through the air, they travel in a way similar to waves of water moving across the surface of the ocean. The shape of a simple radio signal can be depicted as a repeated up and down movement or vibration, as shown in FIG. 1a. This up and down motion of the wave takes place in three dimensions. The simple wave (W) propagates. A wave which is polarized parallel to the plane of propagation is called a horizontally polarized wave. A wave which is polarized perpendicular to the plane of propagation is called a vertically polarized wave. The height or intensity of the wave W is called the amplitude (A) of the wave.

FIG. 1b exhibits a wave which is vertically polarized, while FIG. 1c depicts a wave which is horizontally polarized. Vertical and horizontal polarizations are said to be orthogonal forms of polarization. Other terms that may be used to describe the relationship between waves that are vertically and horizontally polarized are perpendicular, opposite, cross-polarized, or main and complementary. The term primarily used in this document to denote orthogonal polarizations is cross-polarized, or cross-pol or X-pol for short. The idea of polarization is applicable to all forms of transverse electromagnetic waves, whether they are radio waves at microwave frequencies, or light waves such as those emitted by a flashlight.

The power levels radiated by the present invention are much lower than conventional radar systems or than those generated by x-ray or other imaging systems that are currently employed to detect objects at the entry of an airport or a courtroom. In fact, the average power density at the target for the preferred embodiment of this invention is orders of magnitude below the safety limit for non-ionizing radiation.

The present invention preferably operates in the GHz frequency bands. Different radio frequencies offer different benefits and disadvantages for object detection. In the United States, operating frequencies of radio devices are regulated by the Federal Communications Commission. Each country across the globe has similar regulatory bodies that allocate and administer the use of the radio spectrum. Although the specification includes specific references to particular frequency ranges, the system may be beneficially implemented using a wide variety of electromagnetic radiation bands and is not limited by the specifically disclosed ranges.

FIG. 2 presents a non-limiting example of a schematic block diagram of circuitry for implementing a preferred embodiment of the invention. Low power radio transmitter 12 is coupled via first directional coupler 13 to modulator 14, filter 16, and transmitter output amplifier 18, which is connected to transmit/receive antenna 80 through transmit/receive switch 20 and pre-selector 22. Transmit/receive switch 20 is also synchronized with range gate switch 90 through controller 26. Transmit/receive antenna 80 and receive antenna 82, which detects energy at an orthogonal polarization, collect energy reflected back from the target. Alternatively, a single dual-polarized antenna may optionally be used. Polarity selection switch 24 in the receive path selects either the horizontally or vertically polarized antenna or port. Transmit/receive antenna 80 preferably both transmits the signal in horizontal polarization and receives the reflected horizontal or co-pol signal, and receive antenna 82 preferably receives the vertical or X-pol reflected signal in vertical polarization. Polarity switch 24 determines which signal is fed to the receiver at any given time. Pre-selector filters 22, 23 are bandpass filters to prevent out of band signals from entering the receiver and possibly causing spurious responses or saturating the amplifiers and thereby preventing normal operation. Pre-selector filter 22 in the co-pol path also attenuates undesirable harmonics of the transmitter from being transmitted.

Controller or processor 26, preferably comprising start/stopislope programming, is used to control transmitter 12 in conjunction with local oscillator 30. The output of pulse waveform generator 28 is connected to modulator 14. The output of local oscillator 30 is fed to mixer 32 via second directional coupler 11. An output of transmit/receive switch 20 is also fed to mixer 32 through polarity selection switch 24, filter 36 and receive low-noise amplifier 34. A preferably digital output from processor 26 is conveyed to intermediate frequency gain control amplifier 40, which also receives the main signal input from a mixer 32 through band pass filter 41. The output from amplifier 40 then passes through range gate switch 90, high pass filter 42 and to power divider 44. Range gate control 21 and range gate switch 90 provide time gating so that only a signal from a reflector (i.e. target or object) that is at the desired distance from the apparatus is processed. Signals from other objects that arrive at different times are ignored. Power divider 44 splits the signal into two outputs. One output is amplitude demodulated in detector 46, producing narrow pulses which are passed through filter 48, video amplifier 50, gated sample and hold stretcher 52, and then digitized in analog-to-digital converter 54 before being fed back to processor 26. The second output from power divider 44 is fed via power splitter 64 to phase detectors 65, 66 so that the phase shift of the returned signal can be measured at the same time as the amplitude.

Since phase information is very important in order to perform complex frequency to time domain transforms, the phase of the reflected signals is preferably measured. As phase is a relative term, this is accomplished by first establishing a reference signal by mixing samples of the transmit and local oscillator signals. A sample of the transmit signal is taken from transmitter 12 through directional coupler 13 and fed to mixer 9 along with a sample of the local oscillator signal taken from local oscillator 30 through directional coupler 11. The output of mixer 9 is band pass filtered by filter 8 and then limited by limiter amplifier 7 to stabilize its amplitude over the tuning range. The limited signal is fed to quadrature hybrid 72 which outputs two signals that are equal in amplitude but phase shifted relative to each other by 90°. One of the outputs is fed to first phase detector 65 and the other output is fed to second phase detector 66. Two offset phase detectors are used to unambiguously cover a range of 360 degrees. The outputs of phase detectors 65, 66 are analog and subsequently digitized in analog-to-digital converters 68 and 70. The digitized signals are fed to controller 26 for subsequent processing.

The unit of measurement "dBsm" is used to quantify reflected radiation and is based on a unit of measurement called the decibel, abbreviated "dB." Decibels are used to compare two levels of radiated or reflected power. As an example, if a person listening to a radio is very close to the antenna tower of a radio station, the power level would be very high. If the same person were many miles away from the same antenna tower, the strength of the received radio waves would be much lower because of the increased distance. Decibels could be used to quantify this ratio of power levels as a single number. Unlike common fractions, which are simply one number divided by another number, decibels are a logarithmic form of measurement, which is highly useful since they are used to compare very large differences in numbers. Since radiated power levels can vary over such large ranges, a logarithmic scale is used instead of a more common linear scale. The difference in two power levels in decibels is calculated as follows:

$$dB = 10 \log(P_X/P_Y) \quad (1)$$

where $P_X$ is a first power level, and $P_Y$ is a second power level. When the two received radio signals are compared using decibels, the reduction in the power of the signal that is received at the greater distance is said to be a certain number of decibels lower than the power level at the closer location.

The "radar cross section", or RCS, is a measure of the size of an object. When radio waves are generated and then directed toward an object, some portion of those transmitted waves pass through the object, another portion of those waves are absorbed by the target, and a third portion of the transmitted waves are reflected back toward the transmitter. The larger the portion of reflected waves, the greater is the radar cross section of an object. An object that has a relatively large radar cross section is therefore relatively easier to detect, compared to an object that has a smaller radar cross section. The magnitude of the measured radar cross section of an object depends largely on its reflectivity, and on the spatial orientation of the object. For example, suppose a radar station on the shoreline is looking for ships at sea nearby. A ship which is traveling parallel to the coastline is easier to detect than a similar vessel that is sailing away from land, since the radar waves that hit the first ship broadside bounce back to the radar station with greater intensity than those which reflect off of the smaller stern of the second ship. Thus the first ship, which is oriented "sideways" to the direction of travel of the radar waves, has a larger radar cross section than the second ship, whose stern presents a smaller target to the radar waves.

Figure 3:
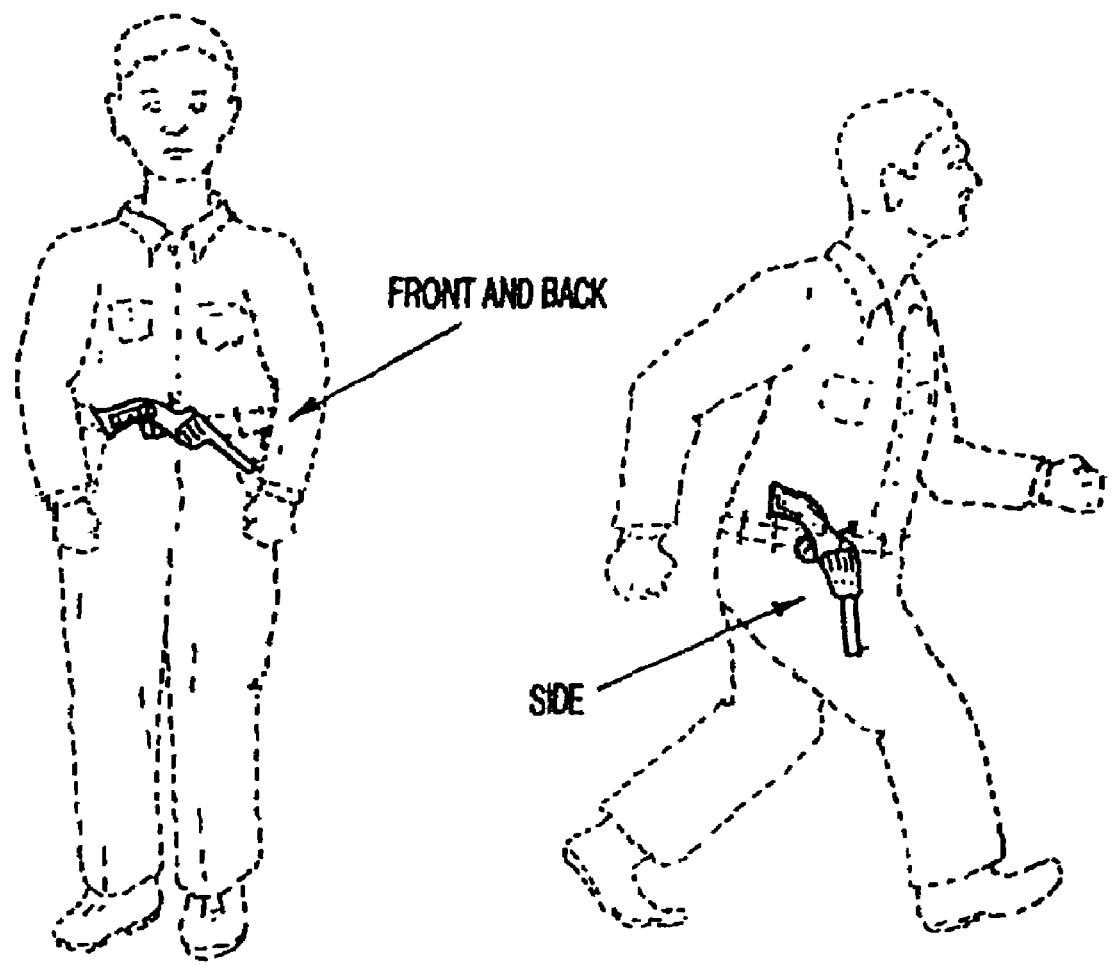
FIG. 3 portrays persons carrying a gun in different locations on the body.
Figure 7A:
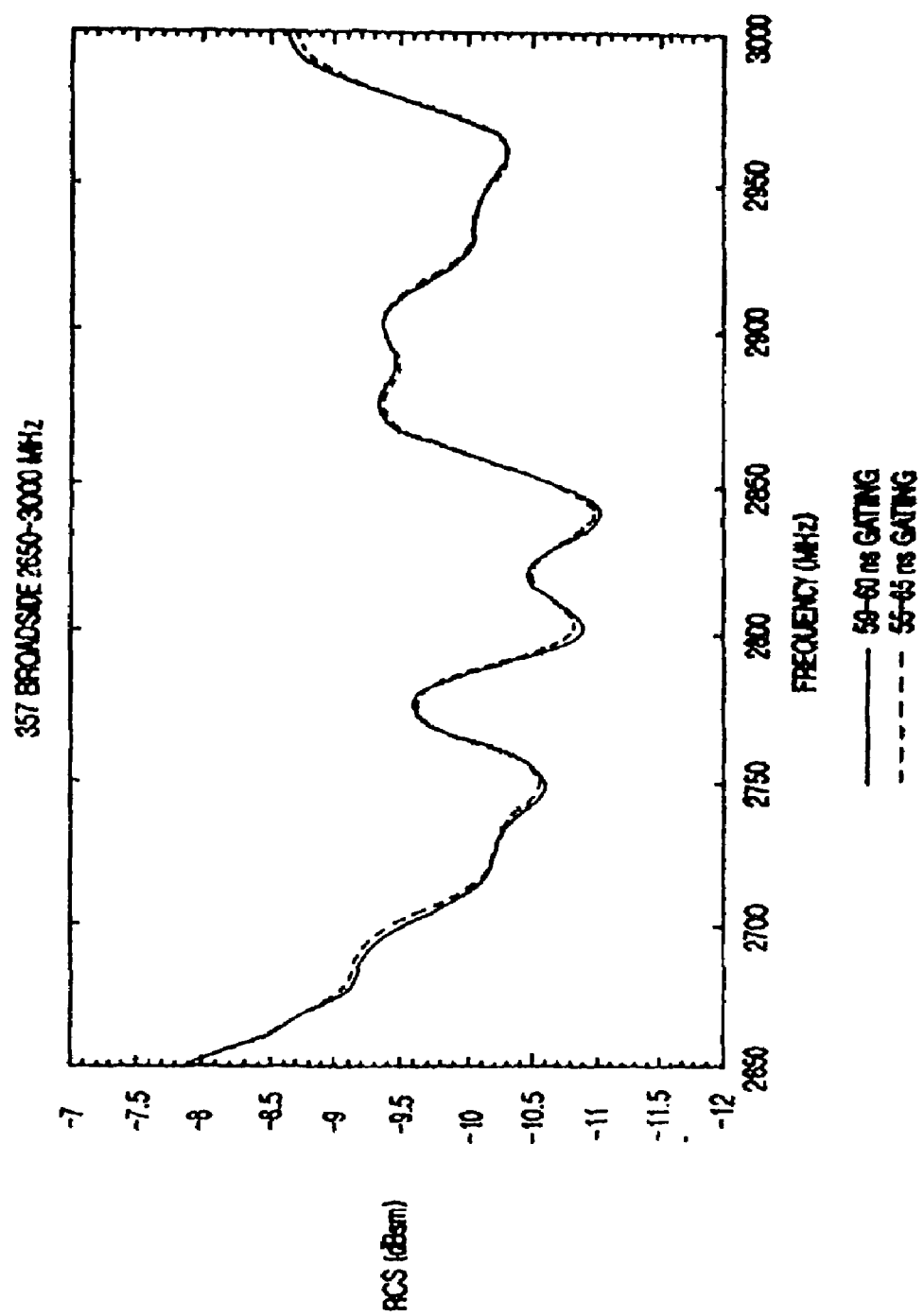
FIG. 7 is a pictorial representation of a preferred embodiment of the method of the present invention. The two graphs at the right of the drawing show that an object such as a weapon may be detected by comparing the time domain difference in amplitudes of two sets of waveforms which correspond to reflected radio waves having different polarizations. In both the upper and the lower graphs, the two waveforms represent the vertically and horizontally polarized radio waves reflected back to the detector.

When the present invention is used to detect an object like a handgun, the detection is more easily accomplished when the handgun is oriented in a way that presents a relatively larger radar cross section to the detector. For example, a gun that is tucked behind a person's belt buckle so that the side of the gun is flat against the waist presents a larger radar cross section than a weapon holstered on the hip with the gun barrel pointing toward the ground and the grip pointing forward or back. FIG. 3 is a pictorial rendition of two persons carrying handguns. On the left side of the figure, a person is shown with a gun held in place either in front or in back of a belt. On the right side of the figure, another person is shown with a gun carried in a bag, pouch, or holster situated on the hip at the person's side. Note that in order for the radar cross sections of the guns in both positions to be similar, the figure must be turned, or facing a different direction, relative to the detector.

The radar cross section when compared to one (1) square meter is expressed in a decibel unit of measurement, "dBsm", as follows:

$$RCS(\text{in dBsm}) = 10 \log(AG) = 10 \log A + 10 \log G \quad (2)$$

where A is the area of the target in square meters and G is the gain of the target on reflection. This expression assumes that the area is flat relative to the wavelength of operation, and that the area is uniformly illuminated by radio waves. If the side of a square area is "a" in meters, then the area becomes "$a^2$" in square meters. For a surface which is flat relative to the wavelength of operation, $$G = 4\pi a^2/\lambda^2 \quad (3)$$

where the wavelength $\lambda$ is equal to 0.3/f meters and f is frequency in GHz. Thus $$RCS(\text{in dBsm}) = 10 \log(4\pi a^4 f^2/0.09) \quad (4)$$

This expression indicates that if the size "a" of the side is doubled, the reflection increases by 12 dBsm, or in linear power units, the cross section is 16 times greater. If the frequency doubles, the reflection becomes 6 dBsm greater or 4 times as great in linear power units. Note that RCS in dBsm increases as 20 log(f). Complicated edge effects are ignored in this description. For example, the radar cross section of a 6"×6" plate at 1 GHz is −11.3 dBsm. Since the factor G, or gain, increases proportional to $f^2$, an increase from 1 to 10 GHz increases the value to 8.7 dBsm, a difference of 20 dB. However, typical weapons shapes are significantly non-planar relative to the radar wavelength, so very little increase is actually realized.

The data in Table 1 is the radar cross section of a metal .357 caliber handgun illuminated by electromagnetic radio waves in several frequency bands. These data were established to calibrate the detector equipment and to provide reference measurements. The test configuration was: one port RCS measurement, 16 averages, time domain gating, and reduced IF bandwidth.

TABLE 1

| Frequency Band (MHz) | Radar Cross Section |
|---|---|
| 500-1000 | −15 dBsm |
| 1000-1750 | |
| 2650-3000 | −10 dBsm |
| 2890-3250 | |
| 9500-10660 | |

Similarly, FIG. 4a provides data on the radar cross section (RCS) of a 0.357 caliber pistol for transmitted radiation spanning the 2650 to 3000 MHz frequency range. The curve shows that for a gun oriented in the broadside position, meaning that the longest dimension of the gun extends sideways in the plane of the transmitted radio wave, the RCS varies from about −8 dBsm to −11 dBsm over this frequency range. FIG. 4b represents a body return, or the RCS of a human body without a weapon, in the same frequency band as FIG. 4a. The average radar cross section across the band is −3 dBsm or approximately 8 dB stronger than the average gun return of −11 dB.

Figure 5:
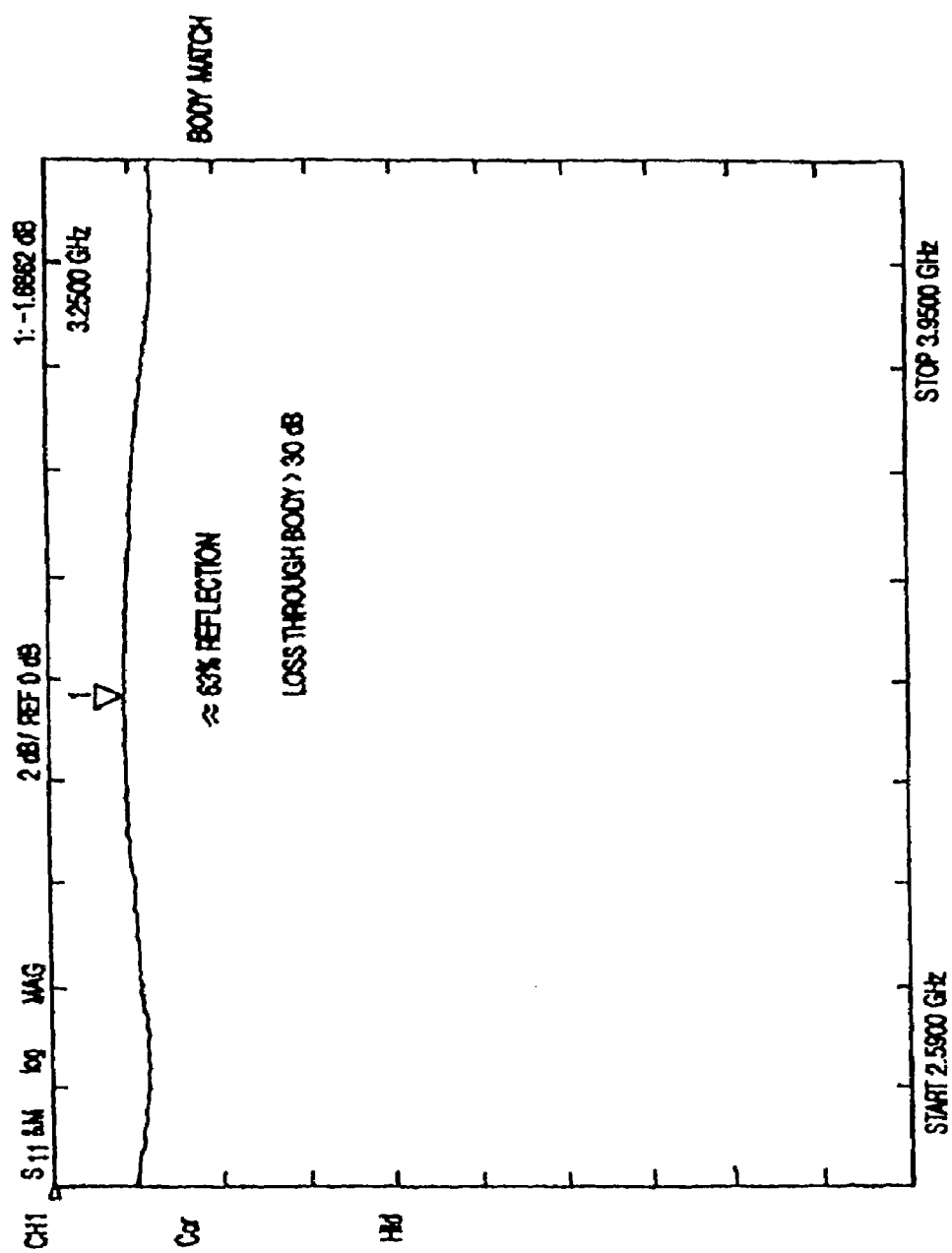
FIGS. 5 and 6 are graphs which supply information concerning the reflectivity of the human body when illuminated with radio waves in the 2.59 to 3.95 GHz and 7.0 to 10.66 frequency bands.
Figure 6:
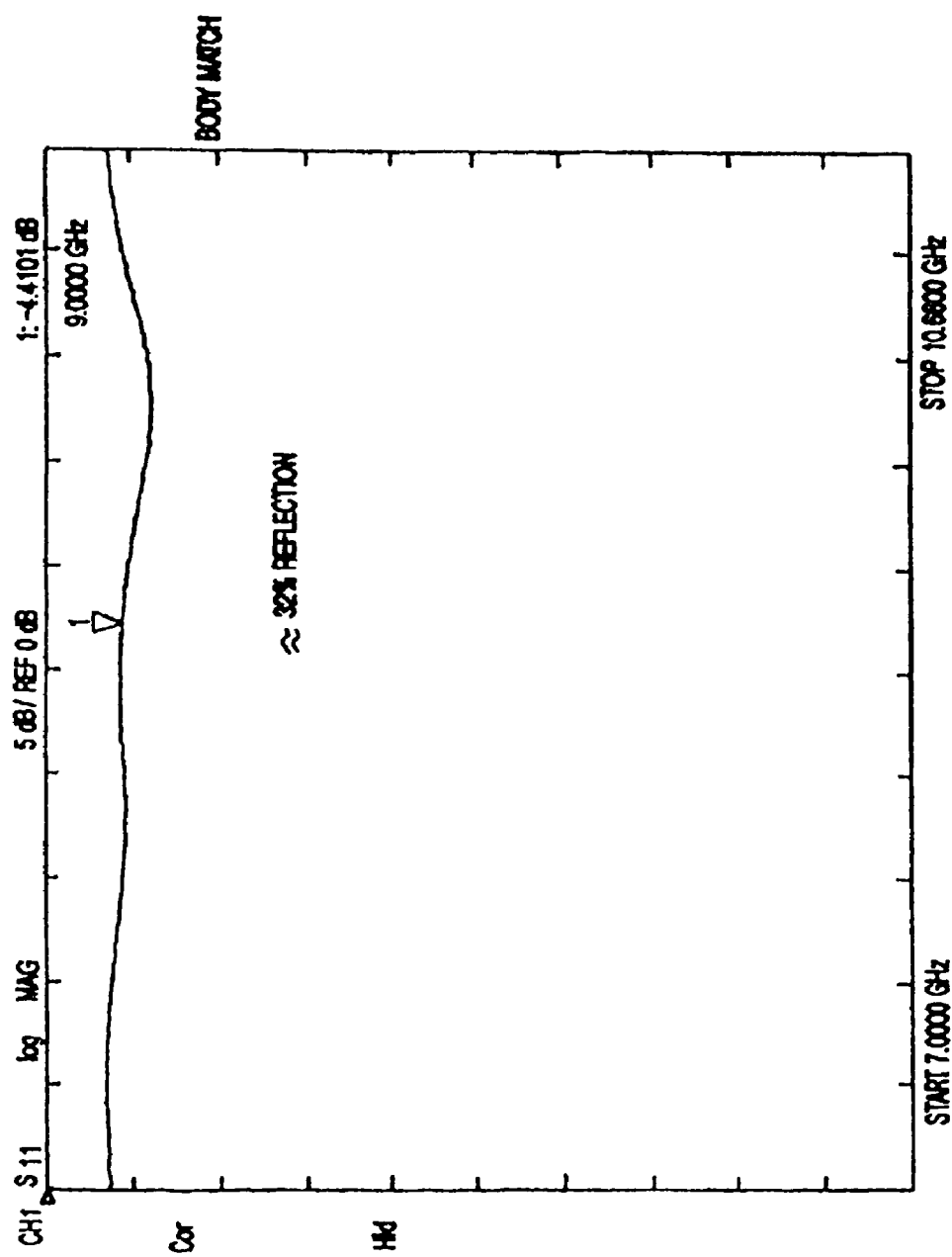

FIGS. 5 and 6 provide measurements of the reflection of radio waves of a person in the test chamber. FIG. 5 contains empirical data that indicates that when a person is illuminated with radiation, about 63% of the radio wave energy is reflected back from the body between 2.59 to 3.95 GHz. FIG. 6 shows that about 32% is reflected back between 7.0 to 10.66 GHz.

In general, the present invention preferably relies on the physical phenomenon of reflection in which a horizontally polarized incident beam will be partially reflected back as vertical polarization. The percentage of energy converted to vertical polarization depends on the shape of the object in the plane normal to the direction of incidence. If the object has a cross sectional shape that has both vertical and horizontal components, then a vertically polarized component will be realized even though the object is irradiated by horizontally polarized waves. This vertically polarized component is referred to herein as the "cross-pol", while the horizontally polarized reflection is referred to as the "co-pol". These terms are reversed if the target and object are irradiated with a vertically polarized incident beam.

As noted above, the difference in backscatter between a .357 hand gun and the human body is approximately −8 dB on the average. In arithmetic terms this means that the combined gun plus body signal will increase only 1.4 dB over the case without a gun. Given that the human body variance is on the order of 6 dB, it is not hard to understand why a gun would be difficult to detect. The major bones in the human body are vertical so it is not surprisingly then that the cross section is higher for incident vertical polarization. This is also true for the vast majority of zippers in clothing.

If incident horizontal polarization is used, the body cross section reduces by approximately 6 dB, and the now vertically polarized cross polarization reduces a like amount. However, the cross polarization of a weapon stays relatively constant. This means that the 1.4 dB difference can now become 7.4 dB, on the average, thereby reducing the effect of the variation from one body to another. Thus, when the target is a human, it is preferable to transmit horizontal polarization, and to receive both horizontal and vertical polarization.

Figure 7:
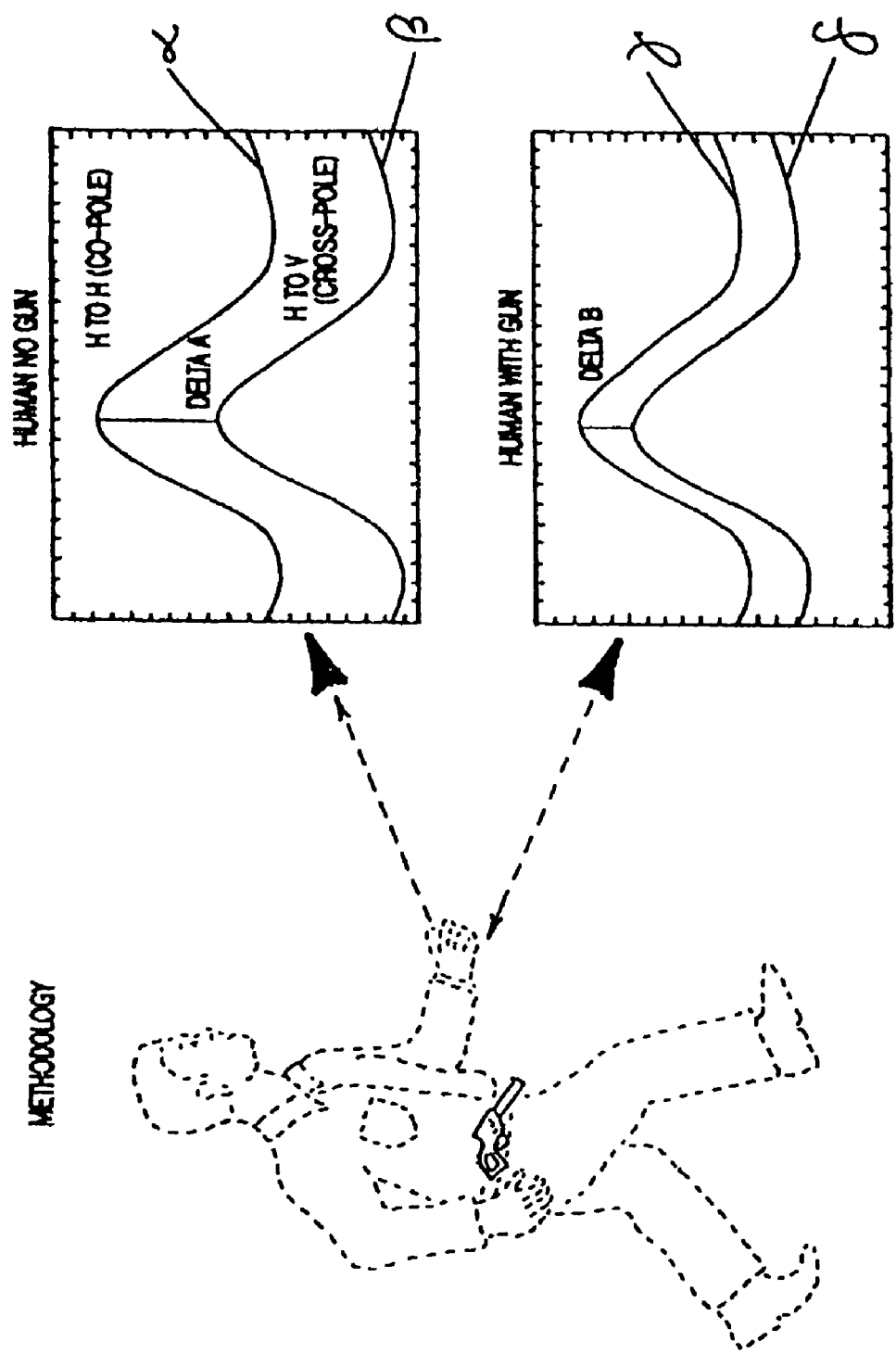

FIG. 7 depicts typical operation of a preferred embodiment of the present invention. Persons entering a protected space, or "Safe Zone™", are illuminated with radio waves which are in this instance horizontally polarized. A portion of these radio waves are absorbed, while some are reflected back toward the transmitter. When the transmitter illuminates a person without a gun, the two curves in the upper graph in FIG. 7 result. These two curves represent the amplitude of the horizontally polarized energy reflected back to the detector (the upper curve labeled "α") and the amplitude of the vertically polarized energy reflected back to the detector (the lower curve labeled "β") in the time domain after applying a Chirp-Z transform (as described below).

The lower graph shown in FIG. 7 contains two curves produced when a person is carrying a handgun that is sensed by the detector in the time domain. As in the upper graph, the two curves represent the energy level of horizontally polarized radio waves reflected from the person (the upper curve labeled "γ") and the energy level of vertically polarized radio waves reflected back from the person (the lower curve labeled "δ") in the time domain. The gap between the maximum amplitude of the curves, labeled "Delta B," is usually somewhat narrower than the gap in the upper graph, labeled "Delta A". In general, when the person has a gun, or any other object that presents a substantial reflective presence, the component of vertically polarized energy that is reflected back from the object increases.

Figure 8:
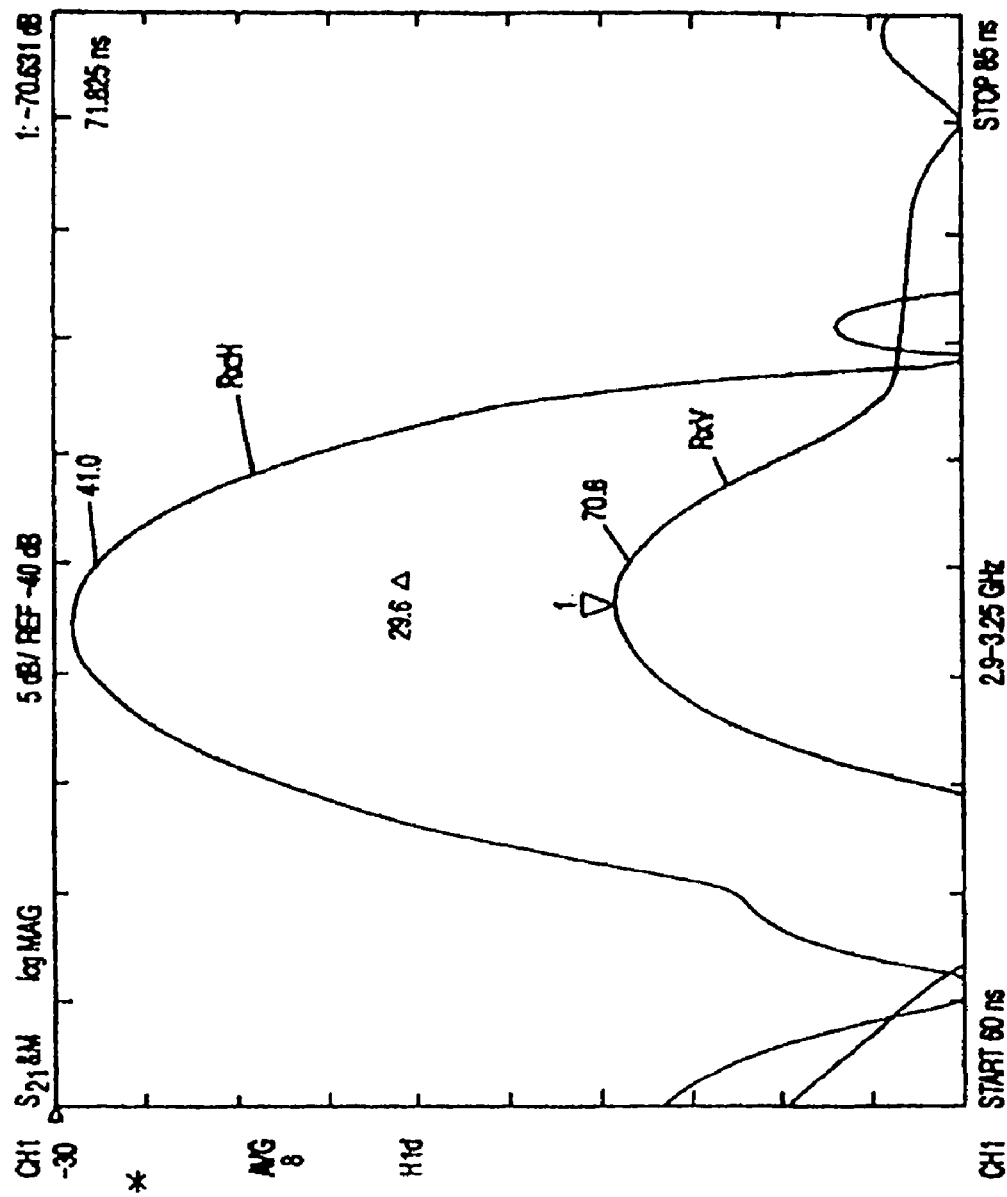
FIGS. 8 and 9 are actual test equipment plots of two pairs of time domain waveforms generated during a handgun detection experiment.
Figure 9:
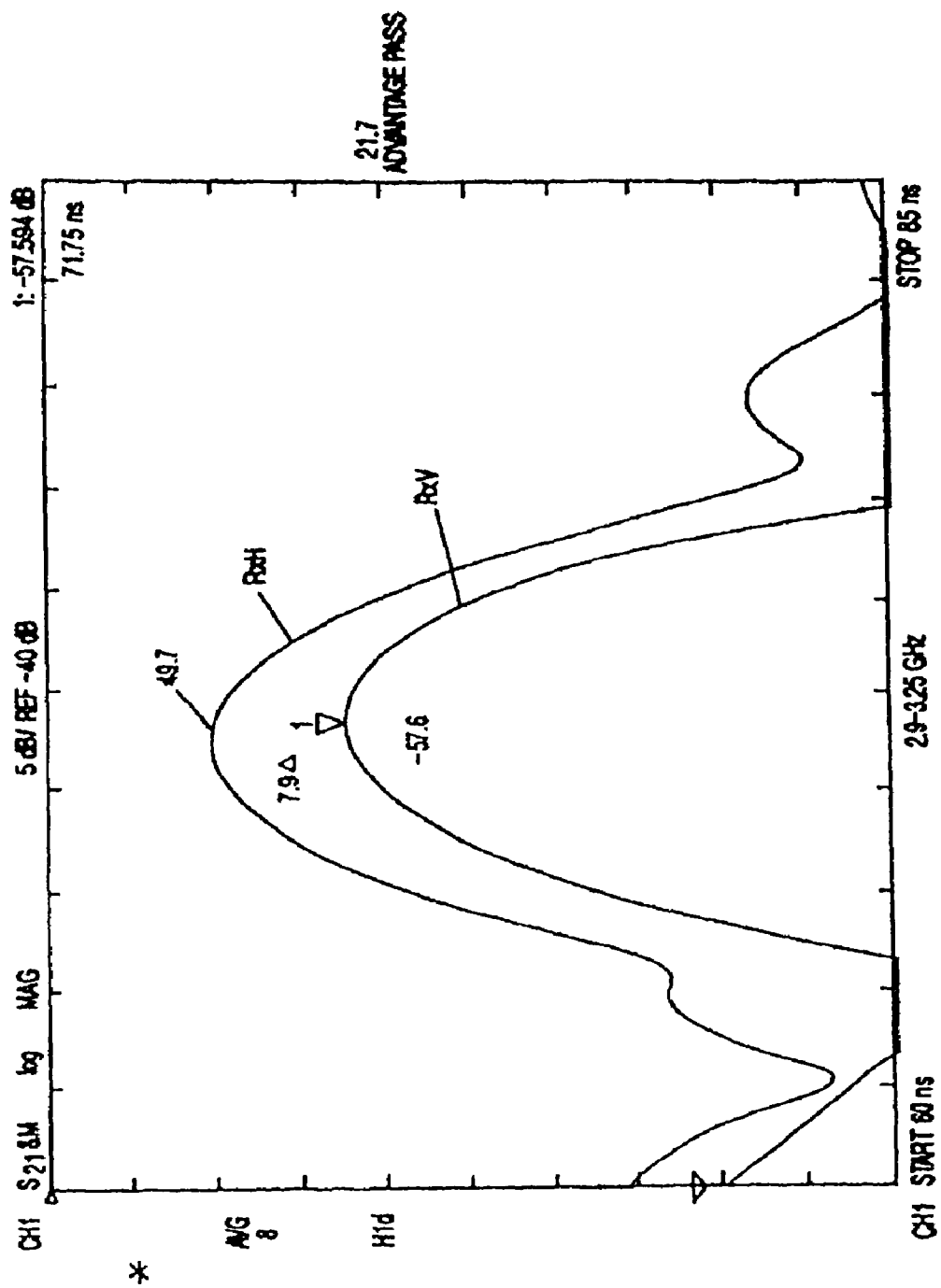

FIGS. 8 and 9 are measured time domain test equipment plots of two pairs of waveforms generated during a handgun detection experiment. In FIG. 8, the person was not carrying a gun, and the maximum values of the two curves are 29.6 dB apart. The incident polarization is horizontal and thus the receive polarization for horizontal is greater than the receive polarization for vertical. In FIG. 9, the same person was carrying a handgun, and the distance between the maximum values of the two curves is now only 7.9 dB, indicating the presence of a gun.

While the decrease in the difference in amplitudes between the two received polarizations was quite dramatic for this one test, in other cases it may be quite small; thus this measurement cannot always be relied upon. Therefore, additional parameters or criteria must be considered when making a decision as to the presence of a weapon. Furthermore, in the real world (which is not an anechoic chamber) signals fade due to multipath effects caused by ground reflections and clutter in the surrounding environment. Multipath effects are preferably minimized by having the radar sweep over a wide range of frequencies, as described above, since a cancellation at one frequency will not have the same effect at another. Sweeping over a wide range of frequencies offers an additional advantage in that the wider the spectrum used in the frequency domain, the better the resolution for time and amplitude in the time domain after the appropriate transform is applied.

Another criterion which is preferably used in the present invention is the relative timing of the peaks of the two return signals changes. When a person has a gun or a bomb, a good portion of the vertically polarized signal, which is mostly created by the weapon, moves forward in time relative to the horizontal return, which is mainly reflected from the body. Such a time shift is another parameter which contributes to the probability of the detection of a weapon.

Furthermore, the shape of both of the polarized returns tends to spread out more when a person is armed because part of the reflection comes from the weapon and part from the body. Therefore, measuring the ratio of the peak value to the area under the curve for each return preferably contributes to determining the probability of object detection.

Finally, the absolute amplitude of the co-pol return (typically horizontally polarized) tends to be greater when a person is armed due to the reflection from the weapon but this, in itself, is not a heavily weighted parameter because of the variation in the sizes of different people. If the co-pol return were significantly greater than the value that is normal for a very large person, then this alone would indicate an abnormality with a particular individual, possibly indicating a concealed object. This parameter is of great significance when a person is wearing a bomb comprising shrapnel.

The present invention is preferably implemented by solving an algorithm which uses a standard set of stored values that represent the signals which are reflected from persons who are not carrying concealed weapons. This data, which is preferably measured and compiled using a number of persons, furnishes the information represented in the upper graph shown in FIG. 7, and in FIG. 8. A standard set of stored values that represent the signals which are reflected from persons who are carrying concealed weapons is also used. This data, which is also preferably measured and compiled using a number of persons, furnishes the information represented in the lower graph shown in FIG. 7, and in FIG. 9. In an advanced implementation of the invention, the detector is capable of adapting to its environment by progressively and continuously learning about the reflected signals that are produced by many persons entering the "Safe Zone™" who are not carrying weapons. This can be accomplished by utilizing one of any number of learning systems, including but not limited to a neural network.

One of the most difficult issues in the gun detection scheme of the present invention is the variance of the human body. All data shown to date used amplitude input only to convert from the measured frequency domain to the displayed time domain plots. However, as discussed above this is inadequate to provide a reliable indication of the presence of a weapon or other object.

U.S. Pat. No. 6,342,696, entitled "Object Detection System", discloses novel methods and apparatuses for detecting concealed weapons, including utilization of a time domain method in which the amplitude difference between the co-polarized and cross-polarized returns from a target area is used to determine if a weapon is present. An algorithm employing a Complex Chirp-Z Transform (CZT), which can accommodate both amplitude and phase data by incorporating phase information into the transformation, is preferably employed to improve the sensitivity of detecting objects. A CZT is a mathematical expression that is used to convert information about frequency to information about time, i.e. to convert from the frequency domain to the time domain. The CZT is a generalization of the Z transform, which is a discrete form of the Laplace Transform.

Measuring the phase of the polarized waves reflected from a person who may be carrying a concealed weapon is important because the polarized waves reflected from a concealed weapon and the polarized waves reflected from a human body behave quite differently. In general, the reflections from a concealed weapon, while not constant, vary within a relatively confined range. In contrast, the reflections from a human body vary in time because the body has depth and the reflections are generated at various depths in the body; the reflections are therefore non-planar. The centroid of the transformed return is at a point that is below the surface of the body. The present invention preferably exploits this characteristic by using signal processing methods to distinguish the relatively compacted signals from a concealed weapon from the generally time/distance varying signals from a human body. The result of using the non-planar data is a reduction in the return from the human body, increasing system sensitivity and the ability of the invention to detect concealed weapons. Thus the CZT helps to separate a first signal which is generated by radiation reflected from an object from a second signal generated by radiation reflected from a target such as a human body.

A complex transform requires the knowledge of the relative phase shift of each frequency component; thus, in order to use a CZT, both amplitude and phase information must be collected during the measurement period. Therefore, a phase detector has been introduced into the instrumentation; see FIG. 2. The phase detector is actually built in two sections, each being fed with identical signals that are offset 90° from each other. Such a quadrature detector is required to eliminate the ambiguities in the phase detector as a single section unit repeats the values at different quadrants of the circle. Since only one frequency exists at a given time, it was preferred to measure the phase relative to the transmitter signal. The phase measurement, preferably of the cross-pol returned signal, is preferably performed at the IF signal. As an alternative, the phase measurement can be performed at the radio frequency (RF) signal without any significant difference; however, it is more difficult and expensive to obtain accurate measurements at RF. In either method, a phase discriminator is used to measure the phase of the returned signal relative to the transmitted signal. However, a concern existed as to maintaining coherency at IF.

Such coherency can be maintained preferably by employing an additional channel to provide a reference at the precise IF of the return signal. This is accomplished preferably by sampling both the transmit and local oscillators and mixing them to produce the phase detector reference. Noise is minimized because the delay in receiving the return is only nanoseconds due to the close proximity of the target. A single phase detection channel is preferably used and is time multiplexed to permit separate phase measurements of the co- and cross-polarity channels. An alternative method to create a stable reference is to employ a stable oscillator operating at the IF and synthesize the local oscillator using the IF reference and transmit oscillators.

Figure 10:
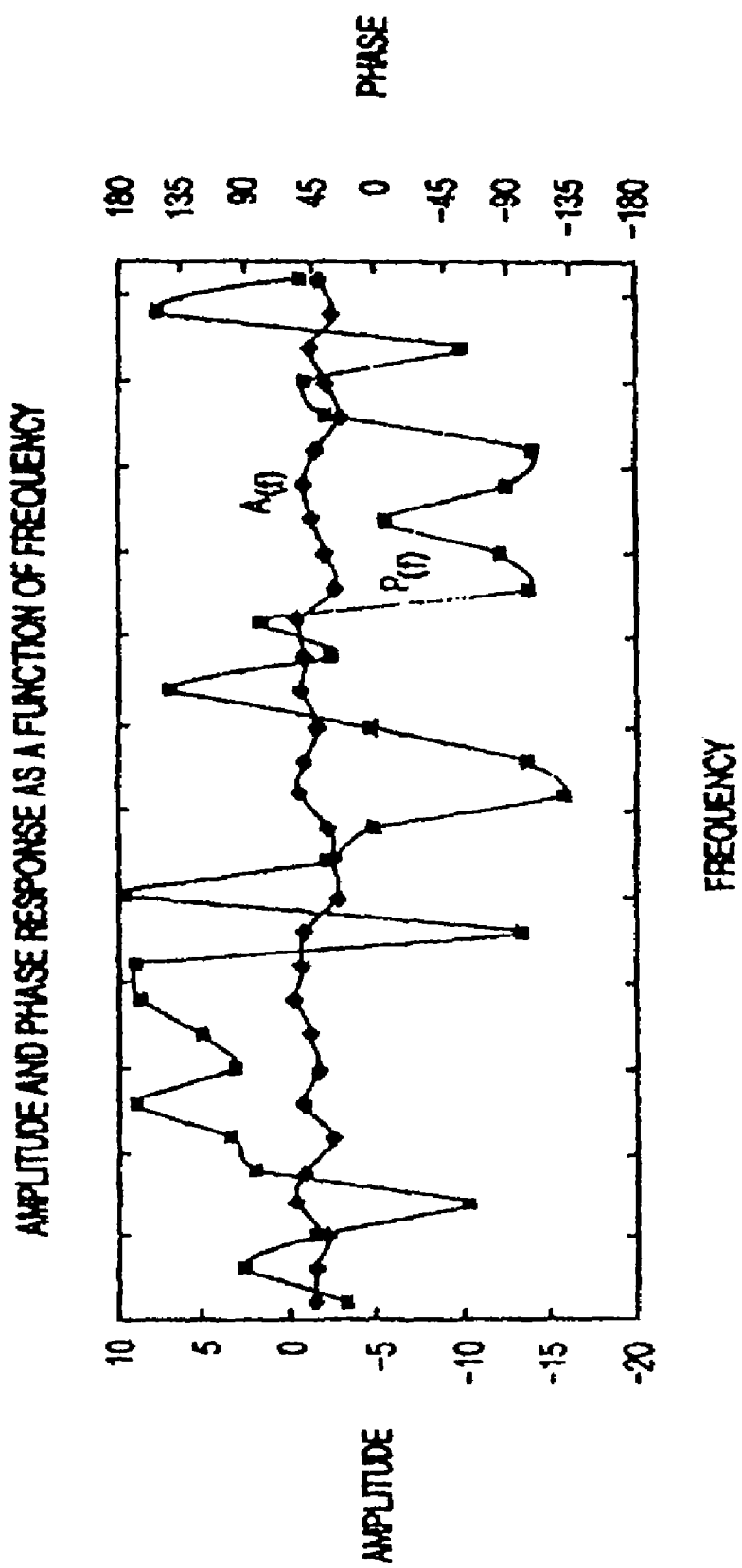
FIG. 10 is a general illustration of the phase and amplitude response used for the Complex Chirp-Z Transforms that are employed in a preferred embodiment of the present invention.

Generalized depictions of sample cross-pole amplitude and phase responses from a human body are presented in FIG. 10. This information is processed using a Complex Chirp-Z Transform. The waveforms in FIG. 10 can be defined as follows:

$$S(f) = A_{fil(f)} \times A_{(f)} e^{(2\pi ft + \delta(f))}$$

where:

$A_{fil(f)}$=amplitude response of the bandpass filter in the frequency domain;

$A_{(f)}$=amplitude response of the cross-pole return in the frequency domain;

f=frequency in gigahertz;

t=time in nanoseconds; and $P_{(f)} = \delta(f)$=phase response of the cross-pole return in the frequency domain.

The frequency band of interest is broken into segments or bins. The number of bins "N" can be any practical value, from zero to a number approaching infinity.

The data acquired from the radar signal consists of the magnitude and phase of the reflected signal at each frequency. In order to be useful, these values must be converted into values representing magnitude vs time. The following are definitions of radar parameters:

N=number of frequency samples at which measurements are made;

F_step=size of frequency steps between samples; and

F_span=total frequency span (N×F_step).

The standard method of converting a frequency signal to time is through the use of an Inverse Discrete Fourier Transform (IDFT). An IDFT transforms N frequency samples into N time samples. The resulting time samples are evenly spaced from time 0 to time=1/F_step with a resolution of 1/F_span. The IDFT is defined as:

$$x(n) = \sum_{k=0}^{N-1} X(k)e^{\frac{j2\pi nk}{N}}$$

Where X(k) are the N frequency samples (complex) and x(n) are the N time samples. For example, with N=128 and F_step=7.8125 MHz, the IDFT gives us 128 time samples each spaced 1 nanosecond apart from time 0 to 128 ns. This method, however, proves to be inadequate for two reasons. First, we are not interested in all of the time from 0 to 128 ns, but only on the very small (~10 ns) time slice where the reflections from the target and object are present. Second, the 1 ns time resolution is too coarse to make the precision time measurements which are preferable for the present invention.

These two inadequacies are resolved by using the Chirp-Z Transform to convert from frequency to time. The Chirp-Z operates on the same principle as the IDFT, but permits the ability to zoom in on a region of interest. The forward (time to frequency) Chirp-Z Transform is given by:

$$X(k) = \sum_{n=0}^{N-1} x(n)A^{-n}W^{nk}$$

where
$A = A_0 e^{j2\pi\theta_0}$
$W = W_0 e^{j2\pi\phi_0}$
and
k=0, 1, ..., M-1
$A_0$ determines the Chirp-Z initial radius;
$W_0$ determines the "spiral factor" of the Chirp-Z transform;
$\theta_0$ determines the starting position as a fraction of the whole interval;
$\phi_0$ determines the step size as a fraction of a whole interval;
N is the number of input (time) values; and
M is the number of output (frequency) values.

By using the above equations and choosing appropriate values for $A_0$, $W_0$, $\theta_0$, $\phi_0$, N and M the interval and resolution of our transform can be chosen. For the present invention, $A_0$ and $W_0$ are preferably set to 1.

The above equations are for the forward (time to frequency) Chirp-Z Transform. The inverse Chirp-Z Transform is computed by taking the complex conjugate of the transform of the complex conjugate of the frequency data. For example, to calculate the values in time from 30 ns to 40 ns with N=128 and M=64 we would set:
$\theta_0$=30/128 (start time divided by total time) and
$\phi_0$=(10/128)/64 (time sweep divided by total time divided by number of output samples)

The data processing for the CWD system preferably comprises the following steps:
1. Acquire the frequency magnitude and phase values;
2. Apply a Hamming window to the values;
3. Convert the magnitude and phase values into real and imaginary values;
4. Conjugate the complex values;
5. Perform the Chirp-Z transform;
6. Conjugate the result; and
7. Convert the result from real and imaginary values into magnitude values.

The following references provide further details on the Chirp-Z transform: "The Chirp-Z Transform Algorithm and Its Applications", L. Rabiner, et al, MIT Lincoln Laboratory, *Bell System Journal*, May-June 1969; "Using the Inverse Chirp-Z Transform for Time Domain Analysis of Simulated Radar Signals", Dean A. Frickey, Idaho National Engineering Laboratory; "Linear Filtering Approach to the Computation of Discrete Fourier Transform", L. Bluestein, GT&E, *IEEE Transactions on Audio and Electroacoustics*, December 1970; and Frederic deCoulon, *Signal Theory and Processing*. The entirety of these references is incorporated herein by reference.

The main advantage of the Chirp-Z Transform over the Fast Fourier Transform is that very accurate time shift data is available with a resolution of tens of picoseconds. This provides information on the spatial position of the generation of the cross-pol return relative to the co-pol return with a resolution of less than 1 inch. This in turn provides information as to whether the cross-pol was generated within the body of a human or by an object in front of, or otherwise on the surface of, the body. The neural network described below preferably utilizes this information as part of the decision making process.

In order to separate the two radar returns from the target, which are of different polarities, a preferred embodiment of the present invention employs an antenna that has dual feeds, one for the co-pole and the other for the cross-pole, using two separate antennas. The first antenna transmits preferably horizontally polarized waves and receives in the same polarity (co-pol). The second antenna preferably only receives in the opposite polarity (cross-pol) and does not transmit. Normally such radars use two receiver channels to keep the two received signals separated. Alternatively the present apparatus may multiplex the signals and use a microwave switch to alternately connect the receiver channel to each of the antennas, thereby saving the cost of a second receiver. This savings is quite substantial. This approach can be applied as well to an antenna design that uses a separate feed for each polarity.

Time multiplexing is preferably accomplished by adding a SP2T switch at the input to the receiver where each input is fed by each antenna. The transmitted signal is preferably a burst of pulses separated by a period, such as about 1 microsecond, as opposed to a single pulse. The returns from each pulse in the group are averaged to negate any unexplained occasional strange readings. A group of preferably 3 to 5 pulses is adequate for this application.

Due to the speed of the measurements relative to the time that it takes a human body to move, the readings can be taken in a variety of sequences as long as a set is completed in less than an arbitrary time of preferably one millisecond. This allows the system to be designed in the most simplified form, as it will not matter if the co- and cross-pol measurements are made at each frequency, or if all the co-pol measurements are made first on one frequency sweep and then the cross-pol measurements on an alternate frequency sweep. The latter method allows the use of a polarity switch to select the co-pol return and then the cross-pol return and use only one receiver to measure both. A relatively slow switch, with a switching time of 50 to 100 nanoseconds, can then be used. A repetition rate of preferably approximately 10 KHz would allow a measurement sweep to be completed in a reasonable time.

A weighting function is preferably applied to the various types of data collected. In addition to the difference between the cross-polarity magnitude at zero time after being converted to the time domain and the co-polarity signal magnitude at zero time after being converted to the time domain there are other pieces of data that are also of value. For example, the values of both the magnitude and phase of the co- and cross-polarity returns provide some indication as to the amount of metal (or other radar reflective material) on a person, even though a larger person produces a return that is about 3 dB greater than a smaller person. However, a person with a bomb may produce a much greater return than a large person. In addition, a plurality of frequency sweeps for each reading, in the course of approximately 300 milliseconds is optionally taken, and an average is preferably calculated. A safe subject (no weapon of any kind) typically produces a significant variation in the five values (large standard deviation), while a person with a weapon typically creates a much tighter pattern. The former condition can have a spread of 5 or more dB, while the latter typically shows a spread of less than 3 dB. Thus this standard deviation may be valuable.

The present invention preferably assigns points to a number of such parameters, although other parameters may be used. The first preferred parameter is the magnitude of the co-polarity return. This in itself is a poor discriminator but it serves as the reference for the other measurements. Points are only assigned to this parameter when its value is extremely large indicating that there is a gross abnormality associated with this subject. For example if the co-pol magnitude is greater than −47 dBm, three points may be assigned; if it is greater than −50 dBm, two points may be assigned; and if it is greater than −55 dBm, one point may be assigned. The unit dBm is an absolute measure of the power relative to one milliwatt. The second preferred parameter is the magnitude of the complex cross-polarity return. For example, if the X-pol magnitude is greater than −60 dBm, 2 points may be assigned, and if it is greater than −62 dBm, 1 point may be assigned. The third preferred parameter is the resulting difference between the magnitudes of the co-polarity and complex cross polarity returns. For example, if the difference is less than 5 dB, four points may be assigned; if the difference is less than 8 dB, two points may be assigned; and if the difference is less than 10 dB, one point may be assigned. The fourth preferred parameter is the time shift between the cross-pol and co-pol signals. A fifth preferred parameter is the shape of the cross-pol waveform; the greater the spread in time of the transformed signal, the greater the probability that the returns are the result of several significant reflectors on this subject. Depending on the measured value of these parameters with reference to empirically determined thresholds, each is preferably assigned a number of points.

The points for each preferred parameter are preferably then added, and if the total is more than an arbitrary or statistically determined upper threshold, it is declared that the person has a weapon or other object; if the total is between a lower threshold and the upper threshold a caution (i.e., retest) is preferably reported, and if the total is less than the lower threshold, it is preferably declared that the person is safe. Preferably two successive "cautions" results in a decision for a weapon or object.

A running total of preferably three successive "snapshots" of the target is preferably performed. The snapshots are preferably taken in about ¼ second increments. Thus, a set of "snapshots" is preferably completed in less than 3 seconds and is taken in slightly different positions as the person moves through the range gate. This is much more meaningful as a weapon may be missed in one position and detected in the others. Alternatively, the target may optionally be asked to rotate a certain amount, for example 120 degrees, with readings taken at each position. Or, more than one apparatus may be placed in different positions and preferably illuminate the target simultaneously from different orientations. If any one of the three snapshots determines that there is a weapon, then preferably the declaration is that there is a weapon. It has however, been found that if the three successive snapshot points are totaled, there is a significant increase in the accuracy of the declaration. Optionally the declaration of a weapon may be determined according to the criteria that each of the snapshots has a minimum number of points for three successive snapshots.

The above process describes a manual implementation of a pattern recognition system. The points assigned to each parameter and their variation with values of those parameters are manually assigned as a result of subjective human decisions. The next step in achieving a more accurate method of determining the weighting of the parameter values (point assignments) is to use an artificial intelligence or a pattern recognition technique, preferably artificial neural net processing. The present invention utilizes software entitled "Pattern Recognition Workbench" (PRW), but any similar such software can be applied. The program is trained by entering the data plus the correct answer; the program then evaluates the data and determines the optimal weighting of each parameter to maximize accuracy. With a small sample of targets (for example, people) a data set can be 100% correct. The output is computer code which is stored in the computer that will do the actual processing. The internal computer then operates in a "hands off" mode to render decisions on any new data accumulated. When applied here, the results are astounding and have improved the prediction accuracy from about 80% for the manually selected weighting to better than 98% for the artificial intelligence selected weighting. This is because the neural network learns when there is an error; for example, when more people of varying sizes and shapes are tested and some do not fit the existing pattern.

Figure 11:
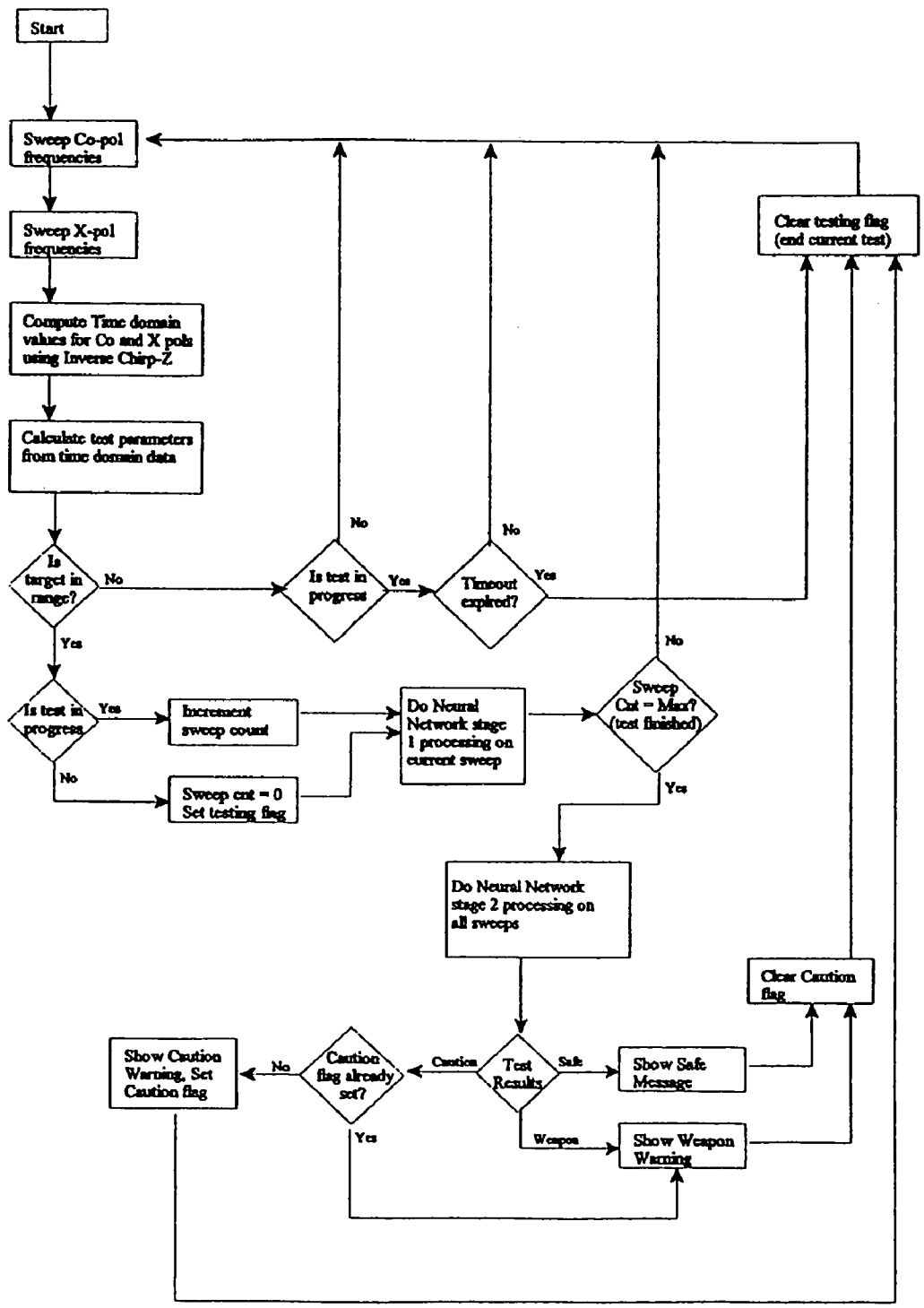
FIG. 11 depicts an operational system flow diagram of a preferred embodiment of the present invention.

A flowchart describing operation of a preferred embodiment of the present invention is presented in FIG. 11.

The system is preferably set up to output a "weapon/no weapon" or "object/no object" decision. The system may optionally provide to the operator a score or ranking which is a measure of the certainty of the decision. This allows the operator to apply his or her own judgment to the situation (for example, taking into account the appearance of the subject). To this end the system of the present invention preferably comprises a video camera and a laser. The video camera permits the operator to be remotely located, in a safe area, and observe the subject being examined. In addition, the subject's score and the neural net decision are preferably shown as an overlay on the video picture. Furthermore, the units preferably accommodate a computer keyboard or similar device so that the operator can start and stop the unit's operation. The operator preferably may change system sensitivity via the keyboard and select front or rear detection in those situations where the subject needs to turn around.

The laser is preferably used to assist in aiming the units during system installation and setup. The laser will also preferably be operated via the keyboard so that the operator can ensure that the system is properly oriented, and to check who is being examined. The laser spot preferably shows up on the video screen.

The system also preferably comprises a second video output to permit a second TV screen to be used to prompt the subject. Upon detection of a subject in the system range gate, the instructions to the subject appear on the prompter screen.

In its quiescent state, the instructions may simply read ENTER TEST AREA or an equivalent message. When a subject enters, the screen instructs him or her to, for example, extend their arms straight out, and then informs the subject when the test is complete. This screen preferably does not show the results of the test, which is displayed only on the remote operator's screen.

The system also preferably comprises a simple contact closure output that can be used to trigger any device, such as an alarm or door lock. For example, a very small indicator box that has a red and green light and an audible beeper may be triggered. This type of box can also function as a simple decision output. However, the video output is much more informative for the operator and also provides feedback for keyboard operation.

In addition to detecting concealed weapons, the present invention may alternatively be employed to detect and/or locate any type or number of objects, including but not limited to distinctly shaped merchandise, manufacturing products or work in process, or inexpensive tags attached to merchandise or other items as an inventory control and/or anti-shoplifting system. The invention may optionally be incorporated into an automatic door control system, for example one comprising automatic door opening, closing, or locking equipment. The system may also be employed as a bomb or explosive detection device. Detection of other objects is a matter of determining which band of frequencies would yield maximum information for the object in question and then accumulate sufficient data to train the artificial neural net.

Continuous Wave Operation

A preferred embodiment of the present invention uses continuous wave, or CW, radar, rather than pulsed radar. There are a number of advantages for CW operation. It is less expensive to produce, since the circuit complexity is lower, and with a pulsed system components must be used which are fast enough to generate the narrow pulses required for short range radar. In addition, accuracy of the phase measurements is significantly increased, and the time-domain output waveforms resulting from the Chirp-Z transform are more uniform, stable, and accurate.

Figure 12:
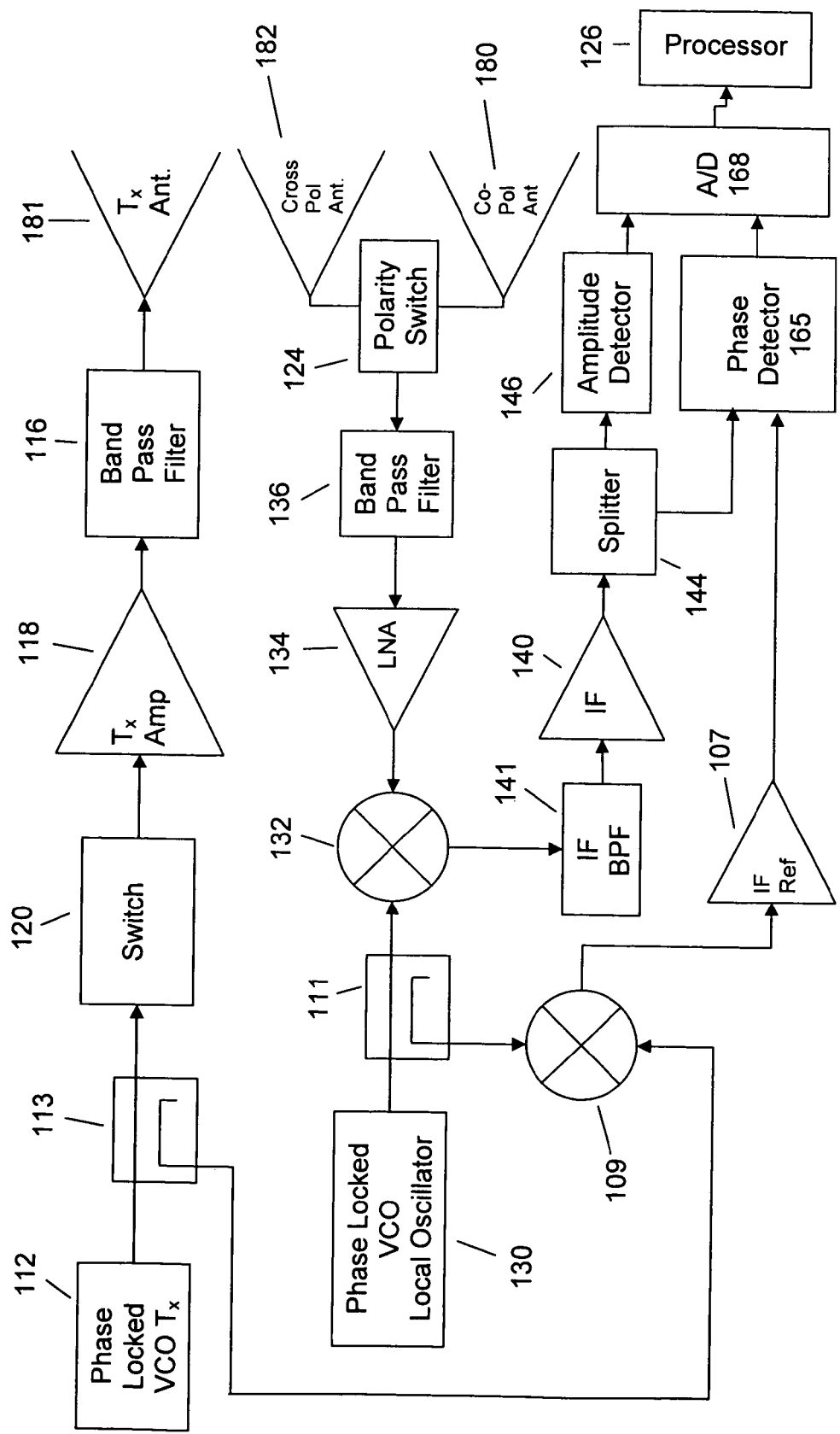
FIG. 12 is a circuit diagram of an interrupted CW embodiment of the present invention.

FIG. 12 presents a non-limiting example of a schematic block diagram of circuitry for implementing a preferred CW embodiment of the invention. Low power radio transmitter 112 is coupled via first directional coupler 113 to switch 120 and transmitter output amplifier 118, which is connected to transmit antenna 181 through band pass filter 116. Since in CW operation signal transmission and reception are preferably performed simultaneously, separate antennas are preferably used for each function. There is no longer a need for a transmit/receive switch or a range gate switch, since range gating is preferably performed mathematically via software processing, as discussed below. Co-pol antenna 180 and cross-pol antenna 182, which detects energy at an orthogonal polarization, collect energy reflected back from the target. Alternatively, a single dual-polarized antenna may optionally be used. Polarity selection switch 124 in the receive path selects either the horizontally or vertically polarized antenna or port and determines which signal is fed to the receiver at any given time. The input signal is then fed to mixer 132 through band pass filter 136 and receive low-noise amplifier 134. The output of phase locked local oscillator 130 is also fed to mixer 132 via second directional coupler 111.

Intermediate frequency gain control amplifier 140 receives the main signal input from mixer 132 through band pass filter 141. The output from amplifier 140 then passes to power divider 144, which splits the signal into two outputs. One output is amplitude demodulated in detector 146 and then digitized in analog-to-digital converter 168 before being fed back to processor 126. The second output from power divider 144 is fed to phase detector 165 to measure the phase shift of the returned signal. The reference phase of a sample of the transmit signal is taken from transmitter 112 through directional coupler 113 and fed to mixer 109 along with a sample of the local oscillator signal taken from local oscillator 130 through directional coupler 111. The output of mixer 109 is fed to amplifier 107 and then to phase detector 165. The output of phase detector 165 is analog and subsequently digitized in analog-to-digital converter 168. The digitized signals are fed to controller 126 for subsequent processing.

The spread spectrum radar of the present invention is preferably operated such that a first frequency is selected for operation for a predetermined time interval and the magnitude and phase of the reflected signal at that frequency are then preferably measured. The process is repeated for other frequencies until the entire desired frequency range is covered. A frequency domain waveform is thereby generated. A Hamming filter is preferably used to select the desired portion of that waveform. The Hamming window preferably scales the data by a predetermined factor to reduce ringing caused by the finite number of sampled frequencies. The resulting frequency domain pattern is preferably processed by a Chirp-Z transform, which creates a range-gated time domain signal; that is, the output signal spans a specified time range. Since the time range correlates with a specific range of distances to the target, the system provides the ability to select solely that portion of the return that is reflected from the target, i.e. at the desired distance from the apparatus, just as if a physical range gate switch had been used. Signals from other objects that arrive at different times are preferably ignored. Thus with mathematical range gating it is easier for the operator to both set the distance when the unit is installed as well as change the desired distance if, for example, the unit is moved at a later time. Conversion from logarithmic to scalar values before Hamming filtering, and conversion back again to logarithmic values after the Chirp-Z transform, may optionally be performed. Processing of the signals through the neural network or other circuit then preferably proceeds generally as described above.

Multiple Unit Operation

More than one detector of the present invention may be used approximately simultaneously, or in sequence but within a very short time frame (e.g. milliseconds), on the same target to improve object detection capabilities. For example, units may be mounted in different positions surrounding a target, offering different viewpoints so a weapon or other object that is concealed on the side of the target opposite from one of the detectors is exposed to a different detector. For example, multiple units may be placed at the same height or different heights but looking at the subject from different azimuthal angles. Such multiple detectors may render decisions independently of each other.

In addition, the accuracy of detection can be greatly enhanced by the use of two or more units sharing various data among them. In one embodiment, each unit operates independently in terms of transmitting and receiving a signal, and then the units share each of their stored co-pol signal amplitudes (for example). In another embodiment, one or more units collect the co-pol signal amplitude data resulting from their own transmissions as well as transmissions from the other units. An average co-pol can then be determined and used to provide a more accurate reference for the other readings. Each unit can then compare the cross-pol amplitude to not only its own co-pol reading but to the average of all the co-pol readings. Averaging of the cross-pol signals, as well as using other parameters, has also been found to be useful. In a non-limiting example, the number of parameters that have typically been found useful in detecting concealed weapons using two units is sixteen, as opposed to typically only six from a single unit. Each of these parameters preferably shows a positive trend, and as long as each is more than 50% accurate, combining the results of so many parameters significantly increases the accuracy of the system and robustness of the decision. Another possible example of a parameter includes polling to improve the accuracy of the co-pol reference to measuring small time differences between reflections.

When multiple units are used, only one unit should be transmitting at any given time. Thus the CW operation of each unit is preferably interrupted. This is not the same as pulsing the radar, since the period of time that each unit is on is very long compared to the transit time of a signal from the radar to the target and back again, and is also very long to the measurement circuitry's time constants. The system preferably changes frequency approximately every 27 microseconds, so if three units are used in a system (for example, to enable viewing a target from all azimuths simultaneously), each unit has approximately six or seven microseconds to take a reading at each frequency. This time is a sufficiently long period. This interlacing allows readings from three units to be obtained in the same amount of time that other systems need to obtain the readings from one unit.

The software preferably comprises an easy to use graphical user interface (GUI). The installer can preferably easily select the number of units in a system, check that all units are communicating, and actually view the time domain plots. This can help the operator determine if there is any hidden clutter, such as rebar in the floor or metal studs in the walls, that might interfere with system operation. The GUI also preferably allows the operator to select decision thresholds in order to set the system's sensitivity.

EXAMPLE 1

Targets which were tested for detection include a variety of weapons, including a .22 caliber pistol, a Glock 9 mm semi-automatic pistol, an Uzi assault rifle, and a variety of terrorist style bombs including those comprising nails as shrapnel, slingshot balls as shrapnel and explosive simulation packets without shrapnel. Table 2 displays sample test data regarding the detection of a variety of weapons in accordance with the present invention using the 9.5 to 10.7 GHz frequency band and illuminated with horizontal polarization. Data were taken for front views only. This data was taken using 12 different people whose size and weight spanned from about 100 pounds to 220 pounds and heights from about 5'0" to 6'2". As shown, the system was correct for 115 out of 116 safe cases thereby yielding only one false positive and zero false negatives out of 283 weapon cases. (NA means not applicable.)

TABLE 2

| Case | Number of Tests | Correct | % Correct | False Negatives | False Positives | Cautions |
|---|---|---|---|---|---|---|
| .22 Pistol | 60 | 60 | 100% | 0 | NA | 0 |
| Balls | 59 | 59 | 100% | 0 | NA | 0 |
| Glock | 57 | 57 | 100% | 0 | NA | 0 |
| Nails | 62 | 62 | 100% | 0 | NA | 0 |
| Uzi | 45 | 45 | 100% | 0 | NA | 0 |
| No Weapon | 116 | 115 | 99% | NA | 1 | 0 |

Although the present invention has been described in detail with reference to particular preferred and alternative embodiments of the invention, other embodiments can achieve the same result. Persons possessing ordinary skill in the art to which this invention pertains will appreciate that various modifications and enhancements may be made without departing from the spirit and scope of the claims that follow. Variations and modifications of the present invention will be obvious to those skilled in the art and it is intended to cover all such modifications and equivalents. The circuit components that have been disclosed above are intended to educate the reader about particular preferred and alternative embodiments, and are not intended to constrain the limits of the invention or the scope of the Claims. Although the preferred embodiments have been described with particular emphasis on specific hardware configurations or frequency bands, the present invention may be implemented using a variety of circuit components or frequency ranges. Although specific signal processing methods and apparatus have been described with particular emphasis on Chirp-Z Transforms, the alternative embodiments of the present invention may also be implemented using a variety of other mathematical methods. The entire disclosures of all patents and publications cited above are hereby incorporated by reference.

What is claimed is:

1. A method for detecting an object concealed on a target, the method comprising the steps of:
    transmitting continuous wave electromagnetic radiation to the target at selected frequencies within a frequency range;
    receiving two orthogonally polarized signals reflected from the target at each selected frequency;
    measuring the amplitude and phase of the reflected signals;
    generating a frequency domain waveform;
    transforming the waveform to a time domain in a time window corresponding to a distance to the target; and
    processing the time domain waveform to determine whether an object is concealed on the target.

2. The method of claim 1 further comprising the step of filtering the frequency domain waveform.

3. The method of claim 2 wherein the filtering step comprises using a Hamming filter.

4. The method of claim 1 wherein the transforming step comprises using a Chirp-Z transform.

5. The method of claim 1 wherein the transforming step results in range gating of the signal.

6. The method of claim 1 employing a plurality of units, each unit performing the transmitting and receiving steps.

7. The method of claim 6 wherein the units perform the transmitting step sequentially.

8. The method of claim 7 wherein continuous wave transmission of each unit is interrupted to allow the other units to transmit radiation.

9. The method of claim 8 wherein the time of continuous wave transmission of each unit is long compared to the transit time of the radiation from the unit to the target and back to the unit.

10. The method of claim 6 wherein the units perform the receiving step sequentially.

11. The method of claim 10 wherein each unit receives signals transmitted solely by its own transmitter.

12. The method of claim 6 wherein each unit receives signals transmitted by a transmitter of another unit.

13. The method of claim 6 wherein reflected signals received by the units are compared.

14. The method of claim 6 wherein signal amplitudes received by each unit are averaged.

15. The method of claim 6 wherein the units are disposed at different heights relative to the target.

16. The method of claim 6 wherein the units are oriented to illuminate the target from different viewpoints.

17. The method of claim 1 wherein the object is selected from the group consisting of weapon, firearm, bomb, suicide vest, explosive, merchandise, tag, work in process, inventory, and manufacturing product.

18. The method of claim 1 performed to prevent shoplifting or inventory theft.

* * * * *